(12) United States Patent
Wu

(10) Patent No.: US 11,665,581 B2
(45) Date of Patent: *May 30, 2023

(54) DATA TRANSMISSION METHOD, DATA TRANSMITTING END, DATA RECEIVING END, DATA TRANSMISSION SYSTEM AND COMPUTER READABLE STORAGE MEDIUM

(71) Applicant: VIVO MOBILE COMMUNICATION CO., LTD., Chang'an Dongguan (CN)

(72) Inventor: Yumin Wu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,238

(22) Filed: Mar. 4, 2022

(65) Prior Publication Data
US 2022/0191732 A1     Jun. 16, 2022

Related U.S. Application Data

(63) Continuation of application No. 16/620,378, filed as application No. PCT/CN2018/089979 on Jun. 5, 2018, now Pat. No. 11,323,912.

(30) Foreign Application Priority Data

Jun. 8, 2017   (CN) .......................... 201710431213.3

(51) Int. Cl.
*H04W 28/06*     (2009.01)
*H04W 28/02*     (2009.01)
*H04W 80/02*     (2009.01)

(52) U.S. Cl.
CPC ... *H04W 28/0273* (2013.01); *H04W 28/0263* (2013.01); *H04W 28/0268* (2013.01); *H04W 80/02* (2013.01)

(58) Field of Classification Search
CPC ..... H04W 28/02; H04W 28/06; H04W 76/12; H04W 28/0263; H04W 28/0268;
(Continued)

(56) References Cited

U.S. PATENT DOCUMENTS

2016/0241685 A1   8/2016   Shah et al.
2016/0338130 A1  11/2016   Park et al.
(Continued)

FOREIGN PATENT DOCUMENTS

CN    101212404 A    7/2008
CN    102404789 A    4/2012
(Continued)

OTHER PUBLICATIONS

International Preliminary Report & Written Opinion related to Application No. PCT/CN2018/089979; reported on Dec. 19, 2019.
(Continued)

*Primary Examiner* — Nathan S Taylor
(74) *Attorney, Agent, or Firm* — von Briesen & Roper, s.c.

(57) ABSTRACT

The present disclosure provides a data transmission method, related devices and system. The method includes: an upper layer transmits a data packet to a corresponding Service Data Adaptation Protocol (SDAP) entity, according to at least one of a network slice identifier, an SDAP identifier, a flow identifier or a session identifier; the SDAP entity adds the flow identifier to the data packet, and transmits the data packet with the flow identifier to a Packet Data Convergence Protocol (PDCP) entity corresponding to a Data Radio Bearer (DRB), according to a corresponding relationship between the SDAP entity and the DRB.

16 Claims, 16 Drawing Sheets

(58) Field of Classification Search
CPC ... H04W 28/065; H04W 76/11; H04W 80/02; H04W 80/08

See application file for complete search history.

(56) References Cited

U.S. PATENT DOCUMENTS

| | | | |
|---|---|---|---|
| 2018/0205808 A1* | 7/2018 | Yang | H04L 45/00 |
| 2019/0150023 A1* | 5/2019 | Cho | H04W 28/0263 370/235 |
| 2019/0150043 A1* | 5/2019 | Lundqvist | H04W 36/30 370/331 |
| 2019/0182703 A1* | 6/2019 | Huang | H04W 76/12 |
| 2019/0349810 A1* | 11/2019 | Cho | H04W 28/06 |
| 2020/0008118 A1* | 1/2020 | Han | H04W 68/005 |
| 2020/0022213 A1* | 1/2020 | Han | H04W 76/12 |
| 2020/0037197 A1* | 1/2020 | Cho | H04W 28/0263 |
| 2020/0037315 A1* | 1/2020 | Lee | H04W 72/0446 |
| 2020/0037386 A1* | 1/2020 | Park | H04W 80/10 |
| 2020/0045764 A1* | 2/2020 | Kim | H04L 5/0007 |
| 2020/0068427 A1* | 2/2020 | Turtinen | H04W 28/24 |
| 2020/0100136 A1* | 3/2020 | Chang | H04W 28/24 |
| 2020/0128430 A1* | 4/2020 | Yl | H04L 47/2483 |
| 2020/0128431 A1* | 4/2020 | Jo | H04W 80/06 |
| 2020/0178113 A1* | 6/2020 | Jin | H04W 28/0263 |
| 2020/0245184 A1* | 7/2020 | Jin | H04L 45/74 |
| 2021/0084526 A1* | 3/2021 | Wu | H04W 28/0268 |

FOREIGN PATENT DOCUMENTS

| | | |
|---|---|---|
| CN | 106664288 A | 5/2017 |
| WO | 2013174422 A1 | 11/2013 |
| WO | 2016024148 A1 | 2/2016 |

OTHER PUBLICATIONS

First Chinese Office Action for related Application No. 201710431213.3; reported on Dec. 3, 2019.

Chinese Search Report for related Application No. 201710431213.3; reported on Apr. 25, 2019.

Extended European Search Report for related Application No. 18813941.4; reported on May 15, 2020.

Non-Final Office Action for related U.S. Appl. No. 16/620,378; reported on Mar. 26, 2021.

Final Office Action for related U.S. Appl. No. 16/620,378; reported on Aug. 4, 2021,.

3rd Generation Partnership Project, "Technical Specification Group Services and System Aspects; System Architecture for the 5G System; Stage 2 (Release 15)", May 2017, 3GPP TS 23.501 V0.5.0.

3rd Generation Partnership Project, "Technical Specification Group Services and System Aspects; System Architecture for the 5G System; Stage 2 (Release 15)", Jun. 2017, 3GPP TS 23.501 V1.0.0.

3rd Generation Partnership Project, "Technical Specification Group Radio Access Network; NG Radio Access Network; Overall Description; Stage 2 (Release 15)", May 2017, 3GPP TS 38.300 V0.2.0.

3rd Generation Partnership Project, "Technical Specification Group Radio Access Network; NR; NR and NG-RAN Overall Description; Stage 2 (Release 15)", May 2017, 3GPP TS 38.300 V0.2.1.

3rd Generation Partnership Project, "Technical Specification Group Radio Access Network; NR; NR and NG-RAN Overall Description: Stage 2 (Release 15)", May 2017, 3GPP TS 38.300 V0.3.0.

3rd Generation Partnership Project, "Technical Specification Group Radio Access Network; Study on New Radio Access Technology; Radio Interface Protocol Aspects (Release 14)", Mar. 2017, 3GPP TR 38.804 V1.0.0.

LG Electronics Inc., "TP on SDAP PDU format", May 15-19, 2017, 3GPP TSG-RAN WG2 #98, Hangzhou, China, R2-1704473.

ZTE, "Discussion on refleclive QoS", May 15-19, 2017, 3GPP TSG-RAN WG2 Meeting #98, Hangzhou, China, R2-1704648.

LG Electronics Inc, "Transmission of RRC message via CU-DU interface", Feb. 13-17, 2017, 3GPP TSG RAN WG3 Meeting#95, Athens, Greece, R3-170405.

NTT Docomo, Inc., "Presentation of Report to TSG: TR38.804, Version 1.0.0; Study on New Radio Access Technology; Radio Interface Protocol Aspects", Mar. 6-9, 2017, 3GPP TSG-RAN Meeting #75, Dubrovnik, Croatia, Tdoc RP-170477.

* cited by examiner

DATA TRANSMISSION METHOD, DATA TRANSMITTING END, DATA RECEIVING END, DATA TRANSMISSION SYSTEM AND COMPUTER READABLE STORAGE MEDIUM

CROSS-REFERENCE TO RELATED APPLICATION

This patent application is a continuation of U.S. patent application Ser. No. 16/620,378 which is a 35 USC § 371 U.S. national stage of International Application No. PCT/CN2018/089979 filed on Jun. 5, 2018, which claims a priority to Chinese Patent Application No. 201710431213.3 filed with the Chinese Patent Office on Jun. 8, 2017, which is incorporated by reference in its entirely.

TECHNICAL FIELD

The present disclosure relates to communication technologies, and more particularly, to a data transmission method, related devices and system.

BACKGROUND

It is well known that the 5G system has introduced a network-side indication mechanism for Quality-of-Service (QoS). Therefore, during the process of transmitting uplink and downlink data, it is necessary to add QoS indication information (such as flow ID) of an Internet Protocol (IP) flow of a terminal, and this protocol layer is located on a Packet Data Convergence Protocol (PDCP) layer.

However, in 5G QoS control, different data may correspond to different network slice (Slice). One network slice may include multiple Protocol Data Unit (PDU) sessions. One PDU session may include multiple flows. Therefore, how to implement the interaction among an upper layer, a Service Data Adaptation Protocol (SDAP) entity and a PDCP entity becomes an urgent problem to be solved.

SUMMARY

In a first aspect, an embodiment of the present disclosure provides a data transmission method, applied to a data transmitting end, including:

transmitting, by an upper layer, a data packet to a corresponding Service Data Adaptation Protocol (SDAP) entity, according to at least one of: a network slice identifier, an SDAP identifier, a flow identifier, or a session identifier;

adding, by the SDAP entity, the flow identifier to the data packet, and, transmitting the data packet with the flow identifier to a Packet Data Convergence Protocol (PDCP) entity corresponding to a Data Radio Bearer (DRB), according to a corresponding relationship between the SDAP entity and the DRB.

In a second aspect, an embodiment of the present disclosure also provides a data transmission method, applied to a data receiving end, including:

receiving, by a PDCP entity, a data packet from a data transmitting end, transmitting the data packet to a corresponding SDAP entity, according to a flow identifier carried by the data packet; and, forwarding, by the SDAP entity, the data packet to an application protocol layer, or forwarding the data packet to a corresponding network slice, flow and Protocol Data Unit (PDU) session.

In a third aspect, an embodiment of the present disclosure also provides a data transmitting end, including:

a first transmitting module, configured to enable an upper layer to transmit a data packet to a corresponding SDAP entity, according to at least one of a network slice identifier, an SDAP identifier, a flow identifier, or a session identifier, a second transmitting module, configured to enable the SDAP entity to add the flow ID to the data packet, and transmit the data packet with the flow ID to a PDCP entity corresponding to a DRB, according to a corresponding relationship between the SDAP entity and the DRB.

In a fourth aspect, an embodiment of the present disclosure also provides a data receiving end, including:

a receiving module, configured to enable a PDCP entity to receive a data packet from a data transmitting end, transmit the data packet to a corresponding SDAP entity, according to a flow identifier carried by the data packet; and, a forwarding module, configured to enable the SDAP entity to forward the data packet to an application protocol layer, or, forward the data packet to a corresponding network slice, flow and PDU session.

In a fifth aspect, an embodiment of the present disclosure also provides a data transmitting end, including a processor, a memory, a network interface and a user interface, in which the processor, the memory, the network interface and the user interface are coupled through a bus system, the processor is configured to read a program from the memory, and perform steps of the data transmission method at the data transmitting end, which is provided by embodiments of the present disclosure.

In a sixth aspect, an embodiment of the present disclosure also provides a data receiving end, including: a processor, a memory, a network interface and a user interface, in which the processor, the memory, the network interface and the user interface are coupled through a bus system, the processor is configured to read a program from the memory, and perform steps of the data transmission method at the data receiving end, which is provided by embodiments of the present disclosure.

In a seventh aspect, an embodiment of the present disclosure also provides a data transmission system, including a data transmitting end and a data receiving end, which are provided by embodiments of the present disclosure.

In an eighth aspect, an embodiment of the present disclosure also provides a computer readable storage medium, which stores a data transmission program. When the data transmission program is executed by a processor, the processor is caused to perform steps of data transmission method at the data transmitting end, which is provided by embodiments of the present disclosure.

In a ninth aspect, an embodiment of the present disclosure also provides a computer readable storage medium, which stores a data transmission program. When the data transmission program is executed by a processor, the processor is caused to perform steps of data transmission method at the data receiving end, which is provided by embodiments of the present disclosure.

BRIEF DESCRIPTION OF THE DRAWINGS

To describe the technical solutions in the embodiments of the present disclosure more clear, brief descriptions of attached figures needing to be used during illustration of embodiments in the present disclosure will be provided in the following. It is obvious that, attached figures in the following descriptions are only some embodiments of the present disclosure. For persons having ordinary skill in the art, other attached figures may also be obtained according to these attached figures, without paying creative work.

DETAILED DESCRIPTION

To describe the technical solutions in the embodiments of the present disclosure more clear, brief descriptions of attached figures needing to be used during illustration of embodiments in the present disclosure will be provided in the following. It is obvious that, attached figures in the following descriptions are only some embodiments of the present disclosure. For persons having ordinary skill in the art, other attached figures may also be obtained according to these attached figures, without paying creative work.

Figure 1:
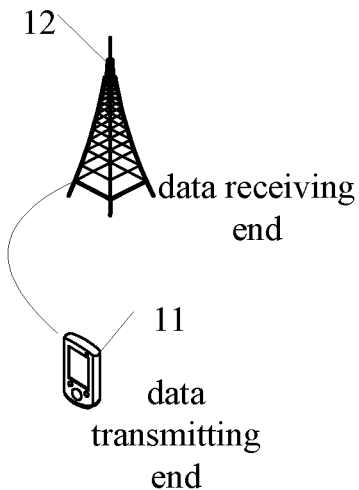
FIG. 1 is a schematic diagram illustrating structure of a data transmission system applied by an embodiment of the present disclosure.

With reference to FIG. 1, FIG. 1 is a schematic diagram illustrating structure of a data transmission system, which is applicable by an embodiment of the present disclosure. As shown in FIG. 1, the data transmission system includes a data transmitting end 11 and a data receiving end 12. The data transmitting end 11 may be a user terminal, which may be also referred to as a User Equipment (UE), which may be a terminal device, e.g., a mobile phone, a Tablet Personal Computer, a Laptop Computer, a personal digital assistant (PDA), a Mobile Internet Device (MID), or a Wearable Device. The data transmitting end 11 may be a network device, e.g., a Transmission Reception Point (TRP), or a base station, in which the base station may be a macro station, e.g., a Long Term Evolution (LTE) evolved Node B (eNB), 5G New Radio (NR) Node B (NB), and so on. The data transmitting end 11 may also be an Access Point (AP). It should be noted that, in the embodiments of the present disclosure, specific type of the data transmitting end 11 is not limited. In the attached figure, an example is given, in which the data transmitting end is a user terminal. The data receiving end 12 may be a UE, e.g., a terminal device, such as, a mobile phone, a tablet, a laptop, a PDA, a MID, or a Wearable Device. The data receiving end 12 may also be a network device, e.g., TRP, or a base station, in which the base station may be a macro station, such as, LTE eNB, 5G NR NB, and so on. The data receiving end 12 may be the AP. It should be noted that, in the embodiments of the present disclosure, specific type of data receiving end 12 is not limited. In the attached figure, an example is provided, in which the data receiving end 12 is a network device.

It should be noted that, in the embodiments of the present disclosure, specific types of data transmitting end 11 and data receiving end 12 are not limited. Specific functions of data transmitting end 11 and data receiving end 12 will be described in detailed, accompanying with multiple embodiments in the following.

Figure 2:
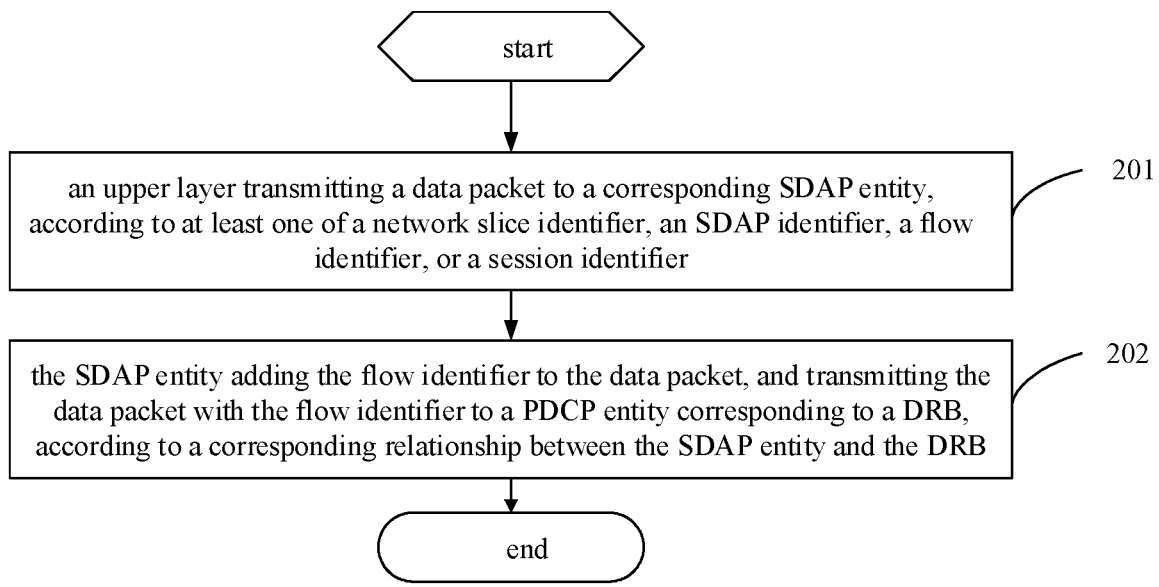
FIG. 2 is a flowchart illustrating a data transmission method, in accordance with an embodiment of the present disclosure.

With reference to FIG. 2, FIG. 2 is a flowchart illustrating a data transmission method, in accordance with an embodiment of the present disclosure. The method is applied to a data transmitting end. As shown in FIG. 2, the method includes the following step.

In step 201, an upper layer transmits a data packet to a corresponding SDAP entity, according to at least one of a network slice identifier (ID), an SDAP ID, a flow ID and a session ID.

The foregoing network slice ID may be configured to identify a network slice, to which foregoing data packet belongs. And, the network slice may include multiple session units (such as, PDU session). A PDU session may include multiple flows. A flow ID may be configured to identify a flow, to which foregoing data packet belongs. Foregoing session ID may be configured to identify a PDU session corresponding to the flow, to which foregoing data packet belongs. In the step, a corresponding SDAP ID is determined, according to the network slice ID of the data packet, the flow ID or session ID. And, the data is transmitted to the corresponding SDAP entity.

In step 202, the SDAP entity adds the flow ID to the data packet, and transmits the data packet with the flow ID to a PDCP entity corresponding to a Data Radio Bearer (DRB), according to a corresponding relationship between SDAP entity and DRB.

The foregoing corresponding relationship between SDAP entity and DRB may be preset. After the flow ID is added to foregoing data packet, the ID of the corresponding flow is added to the data packet. However, the flow ID of the data packet may be added, according to network preset configuration. The PDCP entity corresponding to the DRB may be preset, e.g., one DRB corresponds to one PDCP entity, or multiple DRBs correspond to the same PDCP entity, and so on.

In addition, in the embodiment of the present disclosure, foregoing data packet may be a Transmission Control Protocol (TCP)/IP data packet.

In the embodiment, the upper layer transmits the data packet to the corresponding SDAP entity, according to at least one of the network slice ID, the SDAP ID, the flow ID, the session ID. The SDAP entity adds the flow ID to the data packet, and transmits the data packet with the flow ID to the PDCP entity corresponding to the DRB, according to the corresponding relationship between SDAP entity and DRB. Subsequently, the interaction among the upper layer, SDAP entity and PDCP entity is implemented.

Figure 3:
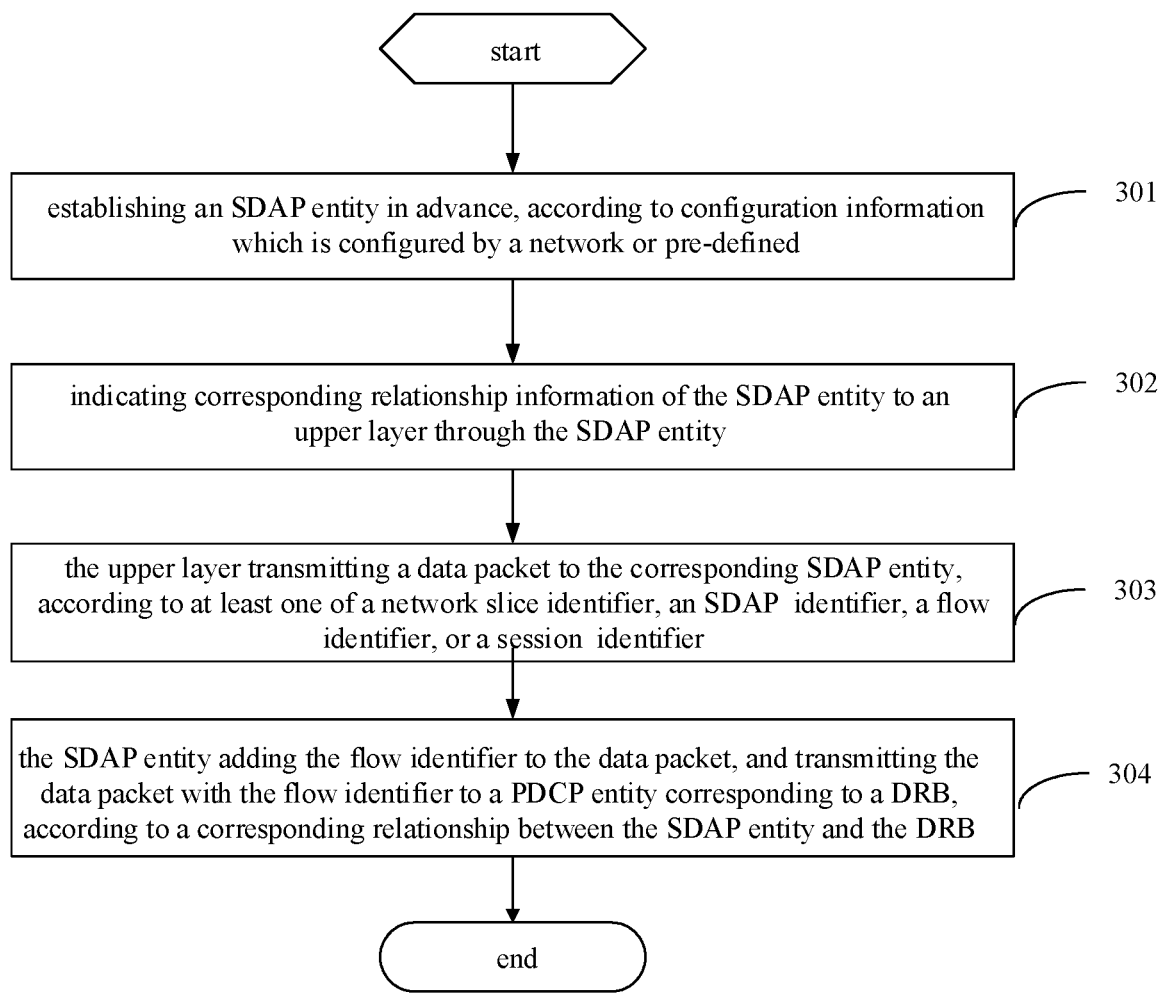
FIG. 3 is a flowchart illustrating another data processing method, in accordance with an embodiment of the present disclosure.

With reference to FIG. 3, FIG. 3 is a flowchart illustrating another data transmission method, in accordance with an embodiment of the present disclosure. The method is applied to a data transmitting end. As shown in FIG. 3, the method includes the following steps.

In step 301, an SDAP entity is established in advance according to configuration information which is configured by a network or pre-defined.

The configuration information includes at least one of: a network slice ID, a DRB ID, a flow ID, a session ID, association relationship indication information.

Foregoing association relationship indication information may indicate a corresponding relationship between above SDAP entity and other entity. Subsequently, in step 301, after receiving foregoing configuration information, the corresponding SDAP entity may be established.

In step 302, corresponding relationship information of the SDAP entity is indicated to the upper layer through the SDAP entity.

The corresponding relationship information includes at least one of: a network slice ID, a DRB ID, a flow ID, a session ID and an SDAP ID.

Foregoing corresponding relationship information may be configured to indicate the corresponding relationship of the SDAP entity, e.g., the corresponding relationship between the SDAP entity and other entity, and may also indicate the relationship among foregoing network slice ID, the DRB ID, the flow ID and the session ID. In addition, the foregoing upper layer may be an entity located on an SDAP layer, e.g., a Non-access stratum (NAS) entity.

In step 303, the upper layer transmits the data packet to the corresponding SDAP entity, according to at least one of the network slice ID, the SDAP ID, the flow ID, the session ID.

In the step, the corresponding SDAP ID may be determined, according to the network slice ID of the data packet, the flow ID or session ID, and then the data is transmitted to the corresponding SDAP entity.

In step 304, the SDAP entity adds the flow ID to the data packet, and transmits the data packet with the flow ID to a PDCP entity corresponding to DRB, according to a corresponding relationship between SDAP entity and DRB.

Optionally, the association relationship indication information includes any one of the following:

indicating that one SDAP entity corresponds to one flow;
indicating that one SDAP entity corresponds to one session unit (e.g., PDU session);
indicating that one SDAP entity corresponds to one PDCP entity;
indicating that one SDAP entity corresponds to one Medium Access Control (MAC) entity;
indicating that one SDAP entity corresponds to one terminal.

Figure 4:
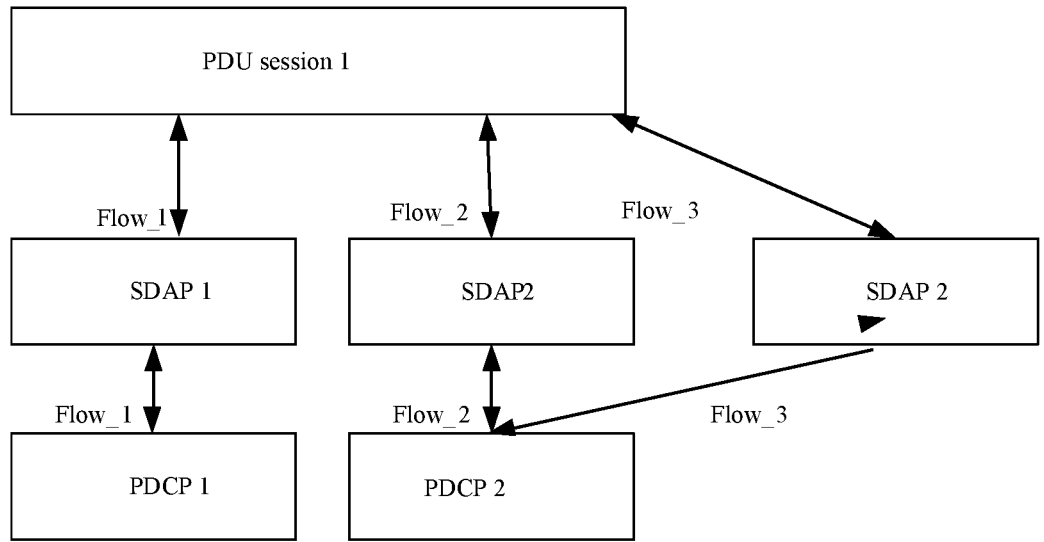
FIG. 4 is a schematic diagram illustrating a flow transmission, in accordance with an embodiment of the present disclosure.

In this implementation, one SDAP entity may be established for each flow. For example, as shown in FIG. 4, a different flow is transmitted to a corresponding PDCP entity through a different SDAP.

It should be noted that, in the embodiment of the present disclosure, the corresponding relationship between flow and PDCP entity may be pre-configured. One PDCP entity may correspond to one, or more flows. And, one PDCP entity may correspond to one DRB, or one SDAP corresponds to one DRB.

Figure 5:
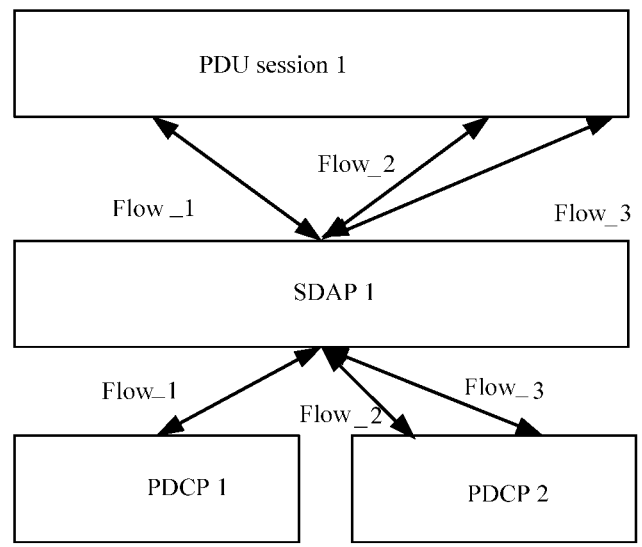
FIG. 5 is a schematic diagram illustrating another flow transmission, in accordance with an embodiment of the present disclosure.

In addition, in foregoing implementation, one SDAP entity may correspond to one PDU session. For example, as shown in FIG. 5, multiple flows of one PDU session are respectively transmitted to a corresponding PDCP entity through one SDAP.

Figure 6:
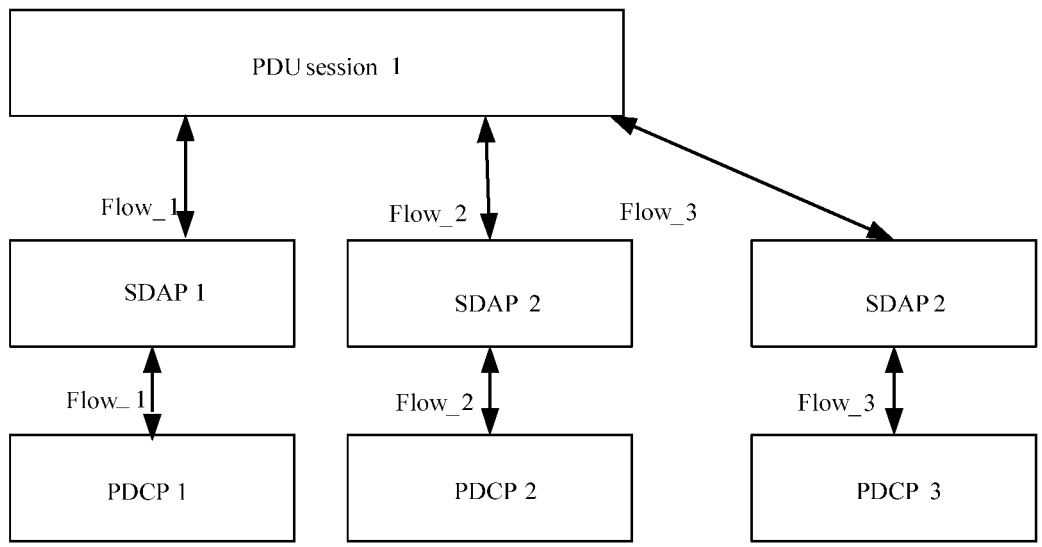
FIG. 6 is a schematic diagram illustrating another flow transmission, in accordance with an embodiment of the present disclosure.
Figure 7:
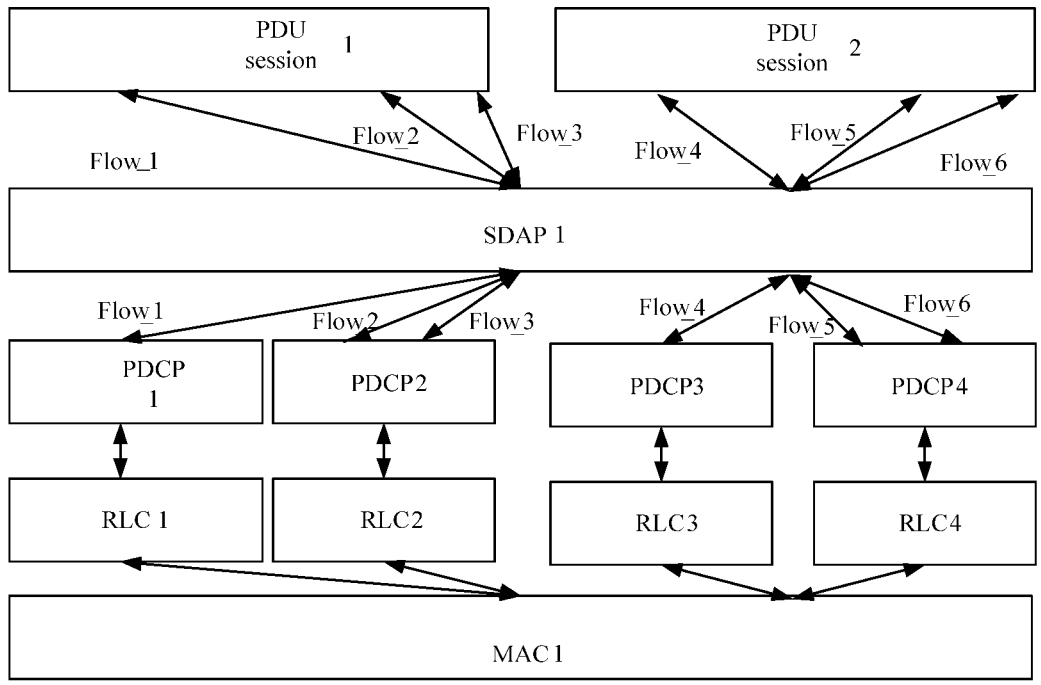
FIG. 7 is a schematic diagram illustrating another flow transmission, in accordance with an embodiment of the present disclosure.

In addition, in foregoing implementation, one SDAP entity may correspond to one PDCP entity. For example, as shown in FIG. 6, flows corresponding to one PDCP entity are respectively transmitted to a corresponding PDCP entity through one SDAP.

In addition, in foregoing implementation, one SDAP entity may correspond to one MAC entity. For example, as shown in FIG. 6, flows of multiple PDU sessions corresponding to one MAC entity are respectively transmitted to a corresponding PDCP entity through the same SDAP entity, and then transmitted to a Radio Link Control (RLC) entity through PDCP, and finally transmitted to the MAC entity.

Figure 8:
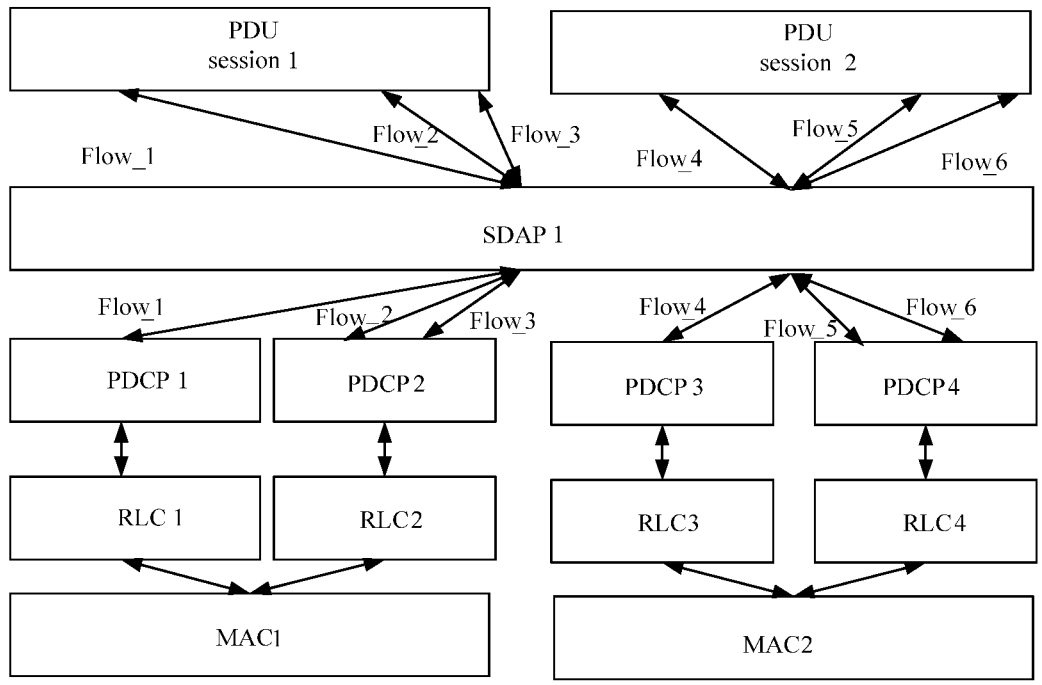
FIG. 8 is a schematic diagram illustrating another flow transmission, in accordance with an embodiment of the present disclosure.

Besides, in foregoing implementation, one SDAP entity may correspond to one terminal. For example, as shown in FIG. 8, flows of multiple PDU sessions corresponding to multiple MAC entities of one terminal are respectively transmitted to a corresponding PDCP entity through the same SDAP entity, and then transmitted to an RLC entity through PDCP, and finally transmitted to the MAC entity of the terminal.

Optionally, when the association relationship indication information indicates that one SDAP entity corresponds to one MAC entity, the configuration information further includes an MAC ID.

In the implementation, when one SDAP entity corresponds to one MAC entity, a corresponding MAC entity is indicated by using foregoing MAC ID.

Optionally, when the association relationship indication information indicates that one SDAP entity corresponds to one PDU session, one SDAP entity corresponds to one PDCP entity, one SDAP entity corresponds to one MAC entity, or one SDAP entity corresponds to one terminal, the corresponding relationship information further includes the association relationship indication information.

In the implementation, when the association relationship indication information indicates that one SDAP entity corresponds to one PDU session, one SDAP entity corresponds to one PDCP entity, one SDAP entity corresponds to one MAC entity, or one SDAP entity corresponds to one terminal, the association relationship indication information is transmitted to the upper layer through foregoing corresponding relationship information. Subsequently, the upper layer determines whether to provide auxiliary information of the data packet, according to the association relationship indication information, so as to enable the SDAP to accurately transmit the data packet, and improve data transmission performance.

For example, when the association relationship indication information indicates that one SDAP entity corresponds to one PDU session, or one SDAP entity corresponds to one PDCP entity, the method further includes:

the upper layer provides auxiliary information of the data packet, in which the auxiliary information includes flow ID.

Subsequently, when one SDAP entity corresponds to one PDU session, or one SDAP entity corresponds to one PDCP entity, the flow ID may be provided, so as to enable the SDAP to accurately add the flow ID, and improve data transmission performance.

In another example, when the association relationship indication information indicates that one SDAP entity corresponds to one MAC entity, or one SDAP entity corresponds to one terminal, the method further includes:

the upper layer provides the auxiliary information of the data packet, in which the auxiliary information includes at least one of: a flow ID, a network slice ID, a session ID.

In the implementation, when one SDAP entity corresponds to one MAC entity, or one SDAP entity corresponds to one terminal, the flow ID, the network slice ID and session ID are provided, so as to enable the SDAP to accurately add the corresponding flow ID, perform an accurate transmission according to the network slice ID and session ID, and improve data transmission performance.

In the embodiment, the SDAP entity is established in advance according to configuration information which is configured by a network or pre-defined. The configuration information includes at least one of: a network slice ID, a DRB ID, a flow ID, a session ID, association relationship indication information. The SDAP entity indicates corresponding relationship information of the SDAP entity to the upper layer. The corresponding relationship information includes at least one of: a network slice ID, a DRB ID, a flow ID, a session ID, an SDAP ID. The data packet is transmitted to the corresponding SDAP entity, according to a corresponding relationship among the network slice ID, the SDAP ID, the flow ID and session ID. The SDAP entity adds the flow ID to the data packet, and transmits the data packet with the flow ID to the PDCP entity corresponding to the DRB, according to the corresponding relationship between SDAP entity and DRB. Subsequently, the SDAP entity may be established flexibly, so as to improve the overall performance of the data transmitting end, and implement interactions among the upper layer, SDAP entity and PDCP entity.

Figure 9:
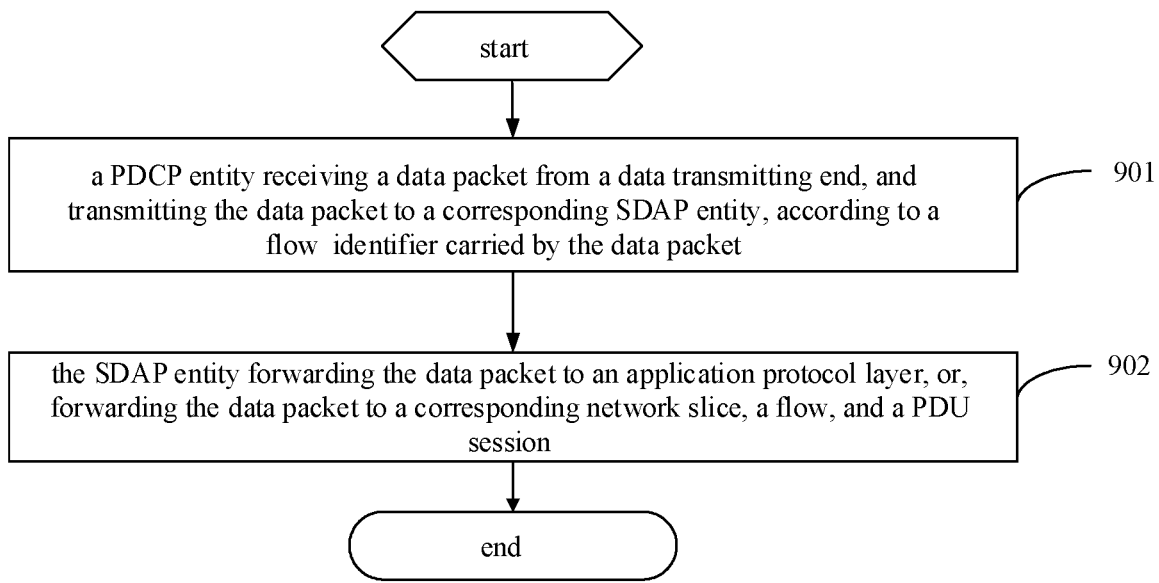
FIG. 9 is a flowchart illustrating another data transmission method, in accordance with an embodiment of the present disclosure.

With reference to FIG. 9, FIG. 9 is a flowchart illustrating another data transmission method, in accordance with an embodiment of the present disclosure. The method is applied to a data receiving end. As shown in FIG. 9, the method includes the following steps.

In step 901, a PDCP entity receives a data packet from a data transmitting end, and transmits the data packet to a corresponding SDAP entity, according to a flow ID carried by the data packet.

Foregoing corresponding SDAP entity may be an SDAP entity corresponding to above-mentioned flow ID.

In step 902, the SDAP entity forwards the data packet to an application protocol layer, or, forwards the data packet to a corresponding network slice, flow or PDU session.

In step 902, when the data receiving end is a user terminal, the SDAP entity forwards the data packet to the application protocol layer. However, when the data receiving end is a network device, the SDAP entity forwards the data packet to a corresponding network slice, flow and PDU session.

In the embodiment, the PDCP entity receives the data packet from the data transmitting end, and transmits the data packet to the corresponding SDAP entity, according to the flow ID carried by the data packet. The SDAP entity forwards the data packet to the application protocol layer, or, forwards the data packet to a corresponding network slice, flow and PDU session, so as to implement interactions between the SDAP entity and the PDCP entity.

Figure 10:
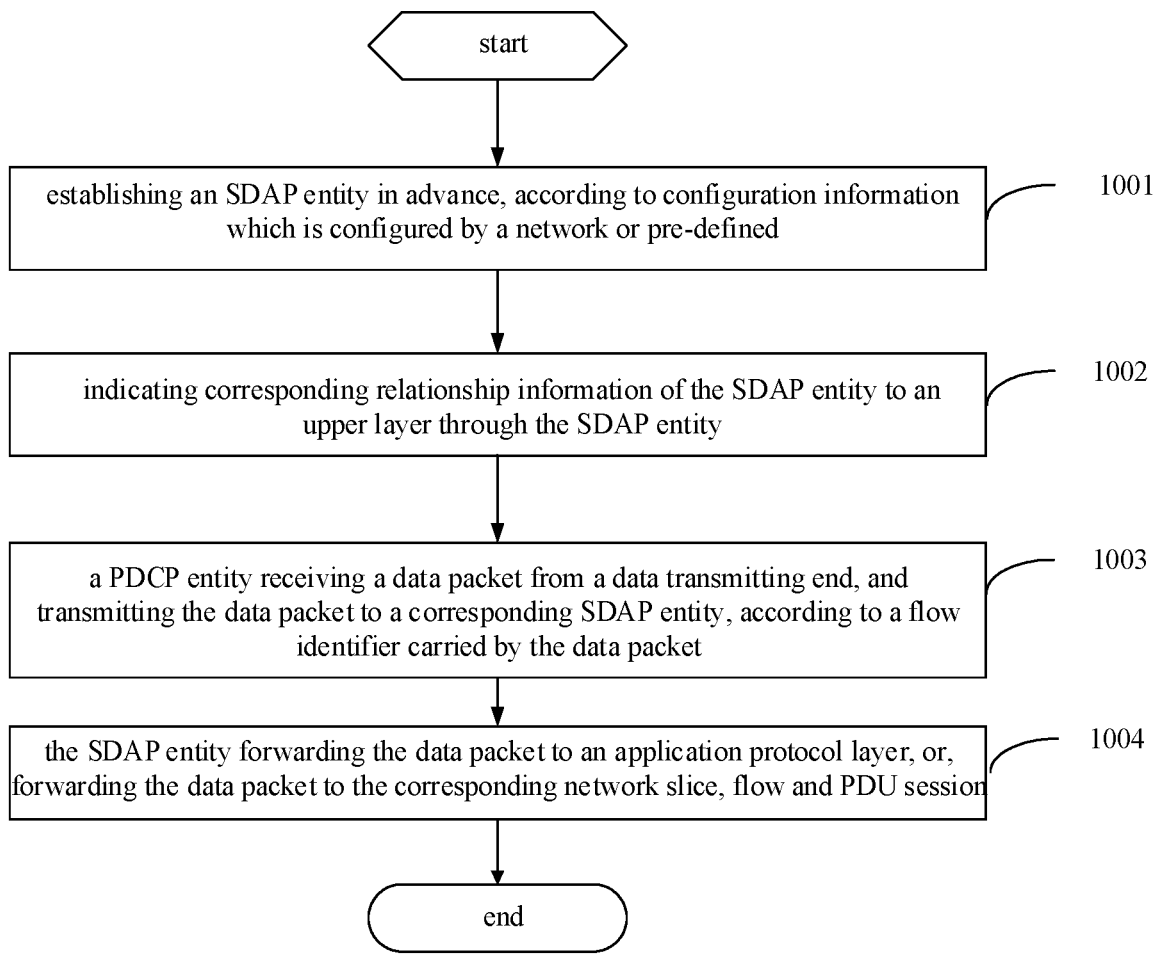
FIG. 10 is a flowchart illustrating another data transmission method, in accordance with an embodiment of the present disclosure.

With reference to FIG. 10, FIG. 10 is a flowchart illustrating another data transmission method, in accordance with an embodiment of the present disclosure. The method is applied to a data receiving end. As shown in FIG. 10, the method includes the following steps.

In step 1001, an SDAP entity is established in advance according to configuration information which is configured by a network or pre-defined. The configuration information includes at least one of: a network slice ID, a DRB ID, a flow ID, a session ID, or association relationship indication information.

Foregoing process for establishing the SDAP entity may refer to corresponding descriptions about the embodiment illustrated with FIG. 3, which is not repeated here. And the same beneficial effects may be achieved.

In step 1002, corresponding relationship information of the SDAP entity is indicated to an upper layer, through the SDAP entity, in which the corresponding relationship information includes at least one of: a network slice ID, a DRB ID, a flow ID, a session ID, or an SDAP ID.

Foregoing corresponding relationship information of the SDAP entity may refer to corresponding descriptions about the embodiment illustrated with FIG. 3, which is not repeated here. Besides, the same beneficial effects may be achieved.

In step 1003, the PDCP entity receives the data packet from a data transmitting end, and transmits the data packet to a corresponding SDAP entity, according to the flow ID carried by the data packet.

Foregoing corresponding SDAP entity may be an SDAP entity corresponding to above-mentioned flow ID.

In step 1004, the SDAP entity forwards the data packet to an application protocol layer, or forwards the data packet to a corresponding network slice, flow and PDU session.

Optionally, the process for the SDAP entity to forward the data packet to a corresponding network slice, flow and PDU session, includes:

the SDAP entity forwards the data packet to the corresponding network slice, flow and PDU session, according to at least one of the network slice ID, the SDAP ID, the flow ID, or the session ID.

In the implementation, the data packet may be accurately transmitted to the corresponding network slice, flow and PDU session, according to foregoing corresponding relation, so as to improve data transmission performance.

Optionally, the association relationship indication information includes any one of the following:

indicating that one SDAP entity corresponds to one flow;
indicating that one SDAP entity corresponds to one PDU session;
indicating that one SDAP entity corresponds to one PDCP entity;
indicating that one SDAP entity corresponds to one MAC entity;
indicating that one SDAP entity corresponds to one terminal.

Foregoing association relationship indication information may refer to corresponding descriptions about the embodiment illustrated with FIG. 3, which is not repeated here. And the same beneficial effects may be achieved.

Optionally, when the association relationship indication information indicates that one SDAP entity corresponds to one MAC entity, the configuration information further includes an MAC ID.

Foregoing configuration information may refer to corresponding descriptions about the embodiment illustrated with FIG. 3, which is not repeated here. And the same beneficial effects may be achieved.

Optionally, when the association relationship indication information indicates that one SDAP entity corresponds to one PDU session, indicates that one SDAP entity corresponds to one PDCP entity, indicates that one SDAP entity corresponds to one MAC entity, or indicates that one SDAP entity corresponds to one terminal, the corresponding relationship information further includes the association relationship indication information.

Foregoing corresponding relationship information may refer to corresponding descriptions about the embodiment illustrated with FIG. 3, which is not repeated here. And, the same beneficial effects may be achieved.

In the embodiment, the SDAP entity is established in advance, according to configuration information which is configured by a network or pre-defined, the configuration information includes at least one of: a network slice ID, a DRB ID, a flow ID, a session ID and association relationship indication information; corresponding relationship information of the SDAP entity is indicated to the upper layer through the SDAP entity, in which the corresponding relationship information includes at least one of: a network slice ID, a DRB ID, a flow ID, a session ID, and an SDAP ID; the PDCP entity receives a data packet from a data transmitting end, and transmits the data packet to a corresponding SDAP entity, according to the flow ID carried by the data packet. The SDAP entity forwards the data packet to an application protocol layer, or, forwards the data packet to a corresponding network slice, flow or PDU session. Subsequently, the SDAP entity may be established flexibly, so as to improve the overall performance of the data transmitting end, and implement the interactions between the SDAP entity and PDCP entity.

Figure 11:
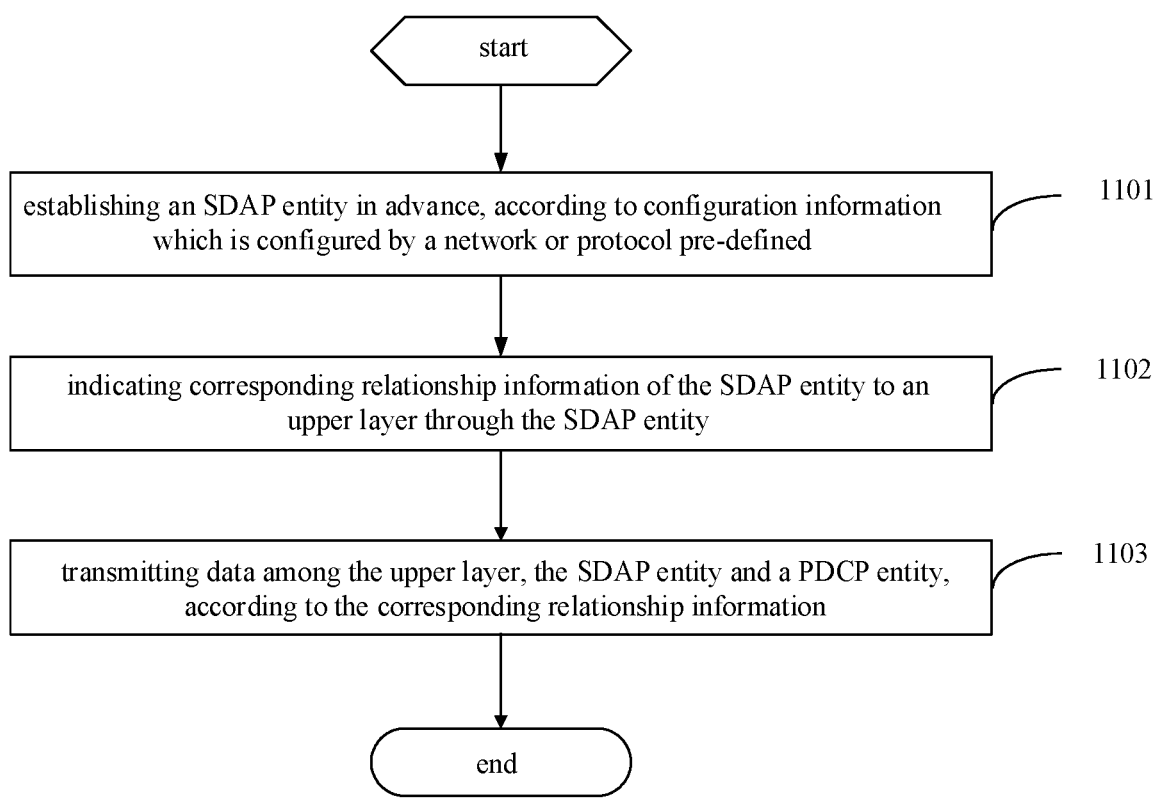
FIG. 11 is a flowchart illustrating a data processing method, in accordance with an embodiment of the present disclosure.

With reference to FIG. 11, FIG. 11 is a flowchart illustrating a data processing method. As shown in FIG. 11, the method includes the following steps.

In step 1101, an SDAP entity is established in advance, according to configuration information which is configured by a network or protocol-agreed, in which the configuration information includes at least one of: a network slice ID, a DRB ID, a flow ID, a session ID, or association relationship indication information.

Foregoing network slice ID is configured to identify a network slice. And, a network slice may include multiple PDU sessions, while a PDU session may include multiple flows. Foregoing DRB ID may be configured to identify a DRB, and the DRB may correspond to the PDCP. Foregoing association relationship indication information is configured to indicate a corresponding relationship between above-mentioned SDAP entity and other entity. Subsequently, in step 201, after receiving foregoing configuration information, a corresponding SDAP entity may be established.

In step 1102, corresponding relationship information of the SDAP entity is indicated to an upper layer, by using the SDAP entity.

Foregoing corresponding relationship information may be configured to indicate a corresponding relationship of the SDAP entity, e.g., a corresponding relationship between the SDAP entity and other entity, and indicate a relationship among foregoing network slice ID, DRB ID, flow ID and session ID. In addition, the foregoing upper layer may be an entity above the SDAP layer, e.g., a NAS layer entity.

In step 1103, data is transmitted among the upper layer, the SDAP entity and a PDCP entity, according to the corresponding relationship information.

Foregoing data transmission among the upper layer, the SDAP entity and the PDCP entity according to the corresponding relationship information may be implemented as follows. Transmitting data among foregoing upper layer the SDAP entity and the PDCP entity, according to a corresponding relationship among entities, or between entity and data, which is indicated by foregoing corresponding relationship information. And, such transmitting data may be sending data, or receiving data.

It should be noted that, the method may be applied to the data receiving end, or the data transmitting end in the system shown in FIG. 1.

In the embodiment, the SDAP entity is established in advance, according to configuration information which is configured by a network or protocol-agreed. The configuration information includes at least one of: a network slice ID, a DRB ID, a flow ID, a session ID, or association relationship indication information. The corresponding relationship information of the SDAP entity is indicated to the upper layer, by using the SDAP entity; and data is transmitted among the upper layer, the SDAP entity and the PDCP entity, according to the corresponding relationship, so as to implement the interactions among the upper layer, the SDAP entity and the PDCP entity.

Figure 12:
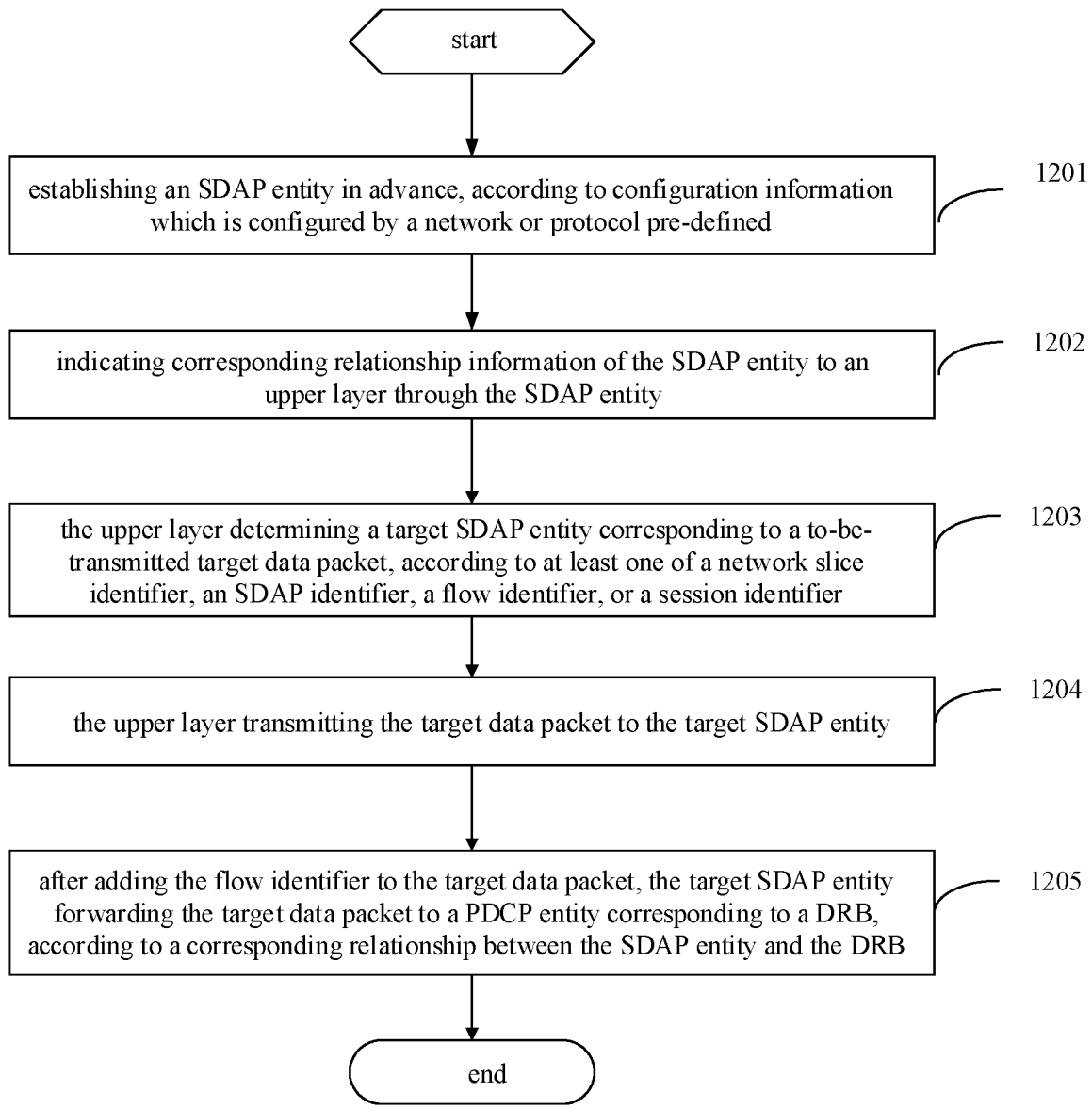
FIG. 12 is a flowchart illustrating another data processing method, in accordance with an embodiment of the present disclosure.

With reference to FIG. 12, FIG. 12 is a flowchart illustrating another data processing method, in accordance with an embodiment of the present disclosure. As shown in FIG. 12, the method includes the following steps.

In step 1201, an SDAP entity is established in advance, according to configuration information which is configured by a network or protocol-agreed. The configuration information includes at least one of: a network slice ID, a DRB ID, a flow ID, a session ID, or association relationship indication information.

Optionally, the association relationship indication information includes any of the following:
  indicating that one SDAP entity corresponds to one flow;
  indicating that one SDAP entity corresponds to one PDU session;
  indicating that one SDAP entity corresponds to one PDCP entity;
  indicating that one SDAP entity corresponds to one MAC entity;
  indicating that one SDAP entity corresponds to one terminal.

In the implementation, one SDAP entity may be established for each flow, e.g., as shown in FIG. 4, a different flow is transmitted to a corresponding PDCP entity through a different SDAP.

It should be noted that, in the embodiment of the present disclosure, the corresponding relationship between the flow and PDCP entity may be pre-configured, one PDCP entity may correspond to one or more flows, and one PDCP entity may correspond to one data bear, alternatively, one SDAP corresponds to one DRB.

Besides, in foregoing implementation, one SDAP entity may correspond to one PDU session, e.g., as shown in FIG. 5, multiple flows of one PDU session are transmitted to respective PDCP entity corresponding to each flow, by using the same SDAP.

Besides, in foregoing implementation, one SDAP entity may correspond to one PDCP entity, e.g., as shown in FIG. 6, a flow corresponding to a PDCP entity is transmitted to the PDCP entity, by using the same SDAP.

Besides, in foregoing implementation, one SDAP entity may correspond to one MAC entity, e.g., as shown in FIG. 6, flows of multiple PDU sessions corresponding to one MAC entity are respectively transmitted to a PDCP entity, which corresponds to each flow, by using the same SDAP entity, and then are transmitted to an RLC entity through the PDCP entity, and finally to the MAC entity.

Besides, in foregoing implementation, one SDAP entity may correspond to one terminal, e.g., as shown in FIG. 8, flows of multiple PDU sessions corresponding to multiple MAC entities of one terminal are respectively transmitted to a PDCP entity, which corresponds to each flow, by using the same SDAP entity, and then, is transmitted to an RLC entity through the PDCP entity, and finally to the MAC entity of the terminal.

In step 1202, corresponding relationship information of the SDAP entity is indicated to an upper layer through the SDAP.

Optionally, when the association relationship indication information indicates that one SDAP entity corresponds to one MAC entity, the configuration information further includes an MAC ID.

In the implementation, when one SDAP entity corresponds to one MAC entity, a corresponding MAC entity is indicated by using foregoing MAC ID.

Optionally, foregoing corresponding relationship information includes at least one of: a network slice ID, a DRB ID, a flow ID, a session ID, or an SDAP ID.

A corresponding relationship among the network slice ID, the DRB ID, the flow ID, the session ID and the SDAP ID may be explicitly indicated, by using foregoing network slice ID, DRB ID, flow ID, session ID and SDAP ID. Subsequently, when the data is transmitted, the data may be accurately transmitted through a corresponding entity, so as to improve the performance of data transmission.

In step 1203, the upper layer determines a target SDAP entity corresponding to to-be-transmitted target data packet, according to at least one of the network slice ID, the SDAP ID, the flow ID or the session ID.

When foregoing method is applied to the data transmitting end, e.g., terminal or network device, the step 1203 may be performed.

Foregoing target data packet may be a data packet of a certain flow. Subsequently, a target SDAP entity corresponding to target data may be determined, by using above-mentioned corresponding relationship. For example, when one SDAP entity corresponds to one flow, a corresponding SDAP entity may be determined, by using flow of the target data packet. In another example, when one SDAP entity corresponds to one PDU session, a corresponding SDAP entity may be determined, by using a PDU session corresponding to the target data packet. In still another example, when one SDAP entity corresponds to one PDCP entity, a corresponding SDAP entity may be determined, by using a PDCP entity corresponding to a flow of the target data packet. In another example, when indicating that one SDAP entity corresponds to one MAC entity, a corresponding SDAP entity may be determined, by using a MAC entity corresponding to a PDU session of a flow, which corresponds to the target data packet. In another example, when indicating that one SDAP entity corresponds to one terminal, a corresponding SDAP entity may be determined, by using a terminal corresponding to the target data packet.

In step 1204, the upper layer transmits the target data packet to the target SDAP entity.

After determining the target SDAP entity, in step 304, the target data packet may be transmitted to the target SDAP entity. Optionally, when the upper layer transmits the target data packet to the target SDAP entity, for the transmitted data packet, the upper layer may provide one piece of, or multiple pieces of auxiliary information as follows:
  a flow ID, a session ID, an SDAP ID, a DRB ID, a PDCP ID, or a MAC ID.

In step 1205, after adding a flow ID to the target data packet, according to a corresponding relationship between SDAP entity and DRB, the target SDAP entity forwards the target data packet to a target PDCP entity corresponding to the DRB.

Foregoing corresponding relationship between SDAP entity and DRB may be preset. After adding the flow ID to the target data packet, a corresponding flow ID is added to the target data packet, besides, the flow ID of the target data packet may be added, according to network configuration.

Besides, in the embodiment of the present disclosure, foregoing target data packet may be a TCP/IP data packet.

Optionally, when the association relationship indication information indicates that one SDAP entity corresponds to one PDU session, or one SDAP entity corresponds to one PDCP entity, the upper layer provides auxiliary information of the transmitted target data packet, in which the auxiliary information includes a flow ID.

In the implementation, a flow ID may be transmitted to the SDAP entity, so as to accurately enable the SDAP entity to add a corresponding flow ID, and improve the performance of data transmission.

Optionally, when the association relationship indication information indicates that one SDAP entity corresponds to one MAC entity, or one SDAP entity corresponds to one terminal, the upper layer provides the auxiliary information of the transmitted target data packet, in which the auxiliary information includes at least one of: a flow ID, a network slice ID, or a session ID.

In the implementation, a flow ID, a network slice ID and a session ID may be transmitted to the SDAP entity, so as to accurately enable the SDAP entity to add a corresponding flow ID, implement an accurate transmission according to the network slice ID and session ID, and improve the performance of data transmission.

In the embodiment, after performing foregoing steps, data may be accurately transmitted among the upper layer, the SDAP entity and the PDCP entity, so as to improve the transmitting performance of the data transmitting end.

Figure 13:
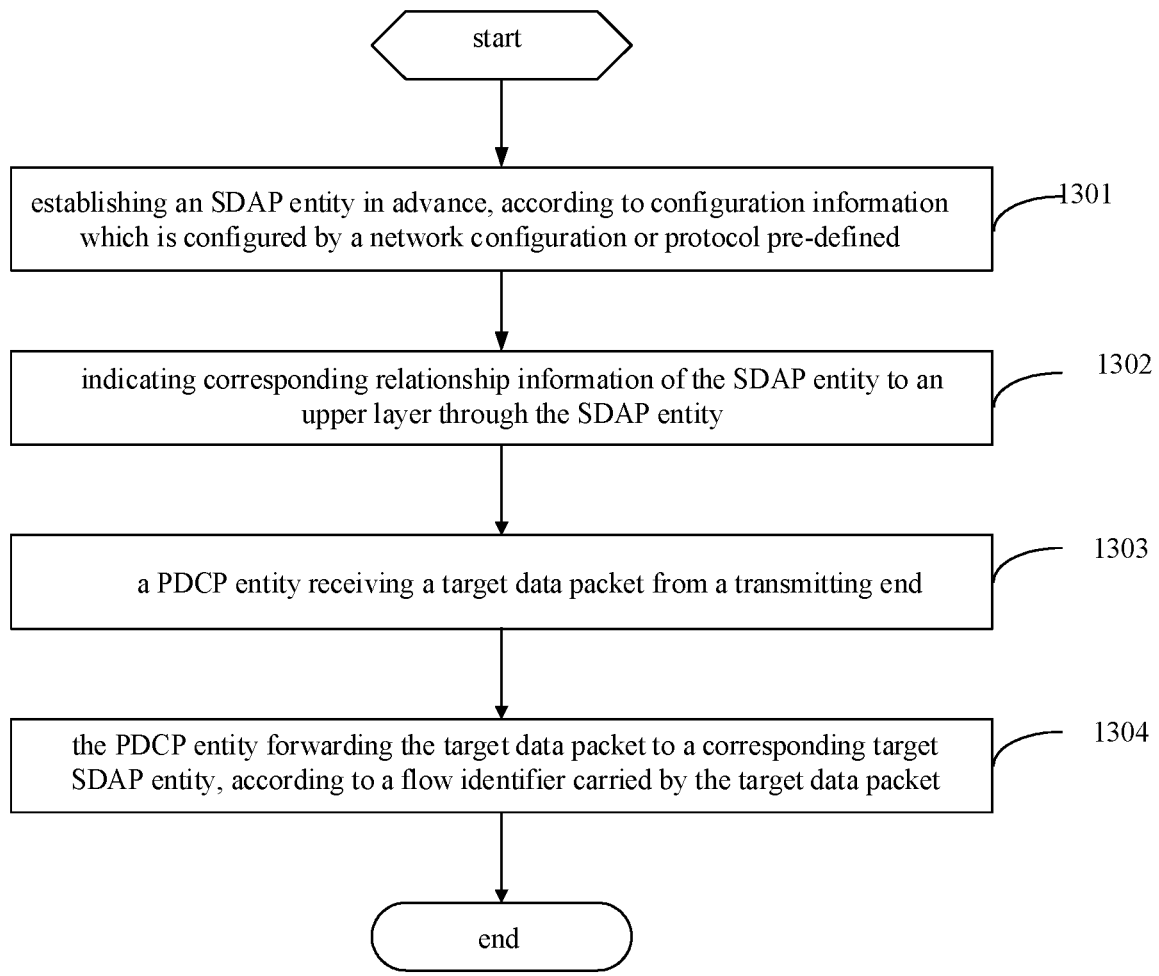
FIG. 13 is a flowchart illustrating another data processing method, in accordance with an embodiment of the present disclosure.

With reference to FIG. 13, FIG. 13 is a flowchart illustrating another data processing data, in accordance with an embodiment of the present disclosure. As shown in FIG. 13, the method includes the following steps.

In step 1301, an SDAP entity is established in advance, according to configuration information which is configured by a network or protocol-agreed, in which the configuration information includes at least one of: a network slice ID, a DRB ID, a flow ID, a session ID, or association relationship indication information.

Optionally, the association relationship indication information includes any of the following:

indicating that one SDAP entity corresponds to one flow;
indicating that one SDAP entity corresponds to one PDU session;
indicating that one SDAP entity corresponds to one PDCP entity;
indicating that one SDAP entity corresponds to one MAC entity;
indicating that one SDAP entity corresponds to one terminal.

Regarding the association relationship indication information, it may refer to corresponding descriptions in the embodiment illustrated with FIG. 12, which is not repeated here.

In step 1302, corresponding relationship information of the SDAP entity is indicated to an upper layer, by using the SDAP entity.

Optionally, when the association relationship indication information indicates that one SDAP entity corresponds to one MAC entity, the configuration information further includes a MAC ID.

In the implementation, when one SDAP entity corresponds to one MAC entity, a corresponding MAC entity is indicated through foregoing MAC ID.

Optionally, foregoing corresponding relationship information includes at least one of: a network slice ID, a DRB ID, a flow ID, a session ID, or an SDAP ID.

A corresponding relationship among the network slice ID, the DRB ID, the flow ID, the session ID and the SDAP ID may be explicitly indicated, by using foregoing network slice ID, DRB ID, flow ID, session ID and SDAP ID. Subsequently, when the data is transmitted, the data may be transmitted accurately through a corresponding entity, so as to improve the performance of data transmission.

In step 1303, a PDCP entity receives a target data packet from a transmitting end.

When foregoing method is applied to a receiving end, e.g., a terminal or network device, step 1303 may be performed.

Foregoing target data packet may be the target data packet in the embodiment illustrated with FIG. 12, which is not repeated here. Besides, the target data packet carries a flow ID.

In step 1304, the PDCP entity forwards the target data packet to a corresponding target SDAP entity, according to the flow ID carried by the target data packet.

Foregoing corresponding target SDAP may be determined, by using above-mentioned association relationship indication information.

Optionally, when foregoing method is applied to a receiving end, and the receiving end is a network device, after forwarding the target data packet to the corresponding target SDAP entity, the method further includes:

the target SDAP entity forwards the received target data packet to a corresponding network slice, flow and PDU session.

In the implementation, the target data packet may be transmitted to a corresponding network slice, flow and PDU session.

Optionally, when foregoing method is applied to a receiving end, and the receiving end is a terminal, the target SDAP entity forwards the received data packet to an application protocol layer.

In the implementation, the terminal may forward the data packet to the application protocol layer through the SDAP entity.

In the embodiment, after performing foregoing steps, data may be accurately received between the SDAP entity and the PDCP entity, so as to improve the receiving performance of the data receiving end.

Figure 14:
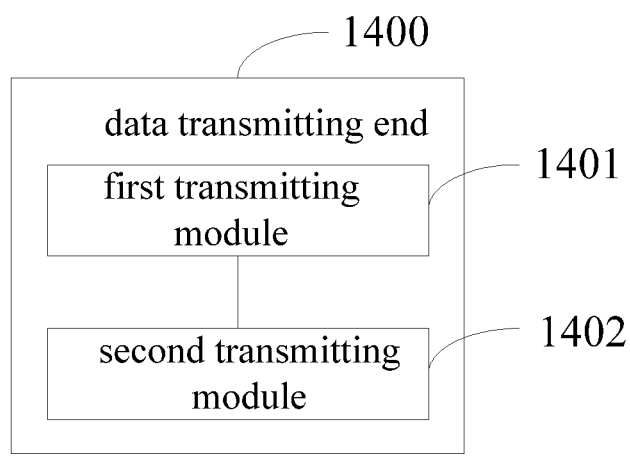
FIG. 14 is a schematic diagram illustrating structure of a data transmitting end, in accordance with an embodiment of the present disclosure.

With reference to FIG. 14, FIG. 14 is a schematic diagram illustrating structure of a data transmitting end, in accordance with an embodiment of the present disclosure. As shown in FIG. 14, a data transmitting end 1400 includes:

a first transmitting module 1401, configured to enable an upper layer to transmit a data packet to a corresponding SDAP entity, according to at least one of a network slice ID, an SDAP ID, a flow ID, or a session ID; and, a second transmitting module 1402, configured to enable the SDAP entity to add a flow ID to the data packet, and transmit the data packet with the flow ID to a PDCP entity corresponding to a DRB, according to a corresponding relationship between the SDAP entity and the DRB.

Figure 15:
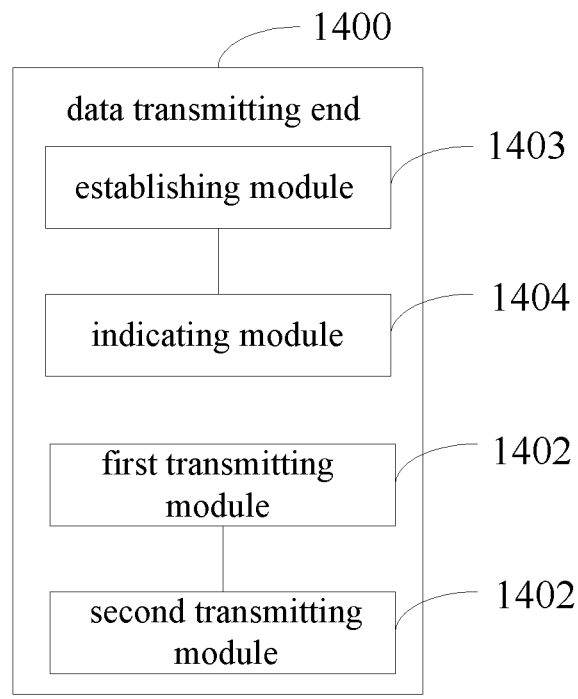
FIG. 15 is a schematic diagram illustrating structure of another data transmitting end, in accordance with an embodiment of the present disclosure.

Optionally, as shown in FIG. 15, the data transmitting end further includes:

an establishing module 1403, configured to establish an SDAP entity in advance, according to network configuration or pre-defined configuration information, in which the configuration information includes at least one of: a network slice ID, a DRB ID, a flow ID, a session ID, or association relationship indication information; and, an indicating module 1404, configured to indicate corresponding relationship information of the SDAP entity to an upper layer, by using the SDAP entity, in which the corresponding relationship information includes at least one of: a network slice ID, a DRB ID, a flow ID, a session ID, or an SDAP ID.

Optionally, the association relationship indication information includes any of the following:

indicating that one SDAP entity corresponds to one flow;
indicating that one SDAP entity corresponds to one PDU session;
indicating that one SDAP entity corresponds to one PDCP entity;
indicating that one SDAP entity corresponds to one MAC entity;
indicating that one SDAP entity corresponds to one terminal.

Optionally, when the association relationship indication information indicates that one SDAP entity corresponds to one MAC entity, the configuration information further includes a MAC ID.

Optionally, when the association relationship indication information indicates that one SDAP entity corresponds to one PDU session, indicates that one SDAP entity corresponds to one PDCP entity, indicates that one SDAP entity corresponds to one MAC entity, or indicates that one SDAP entity correspond to one terminal, the corresponding relationship information further includes the association relationship indication information.

Figure 16:
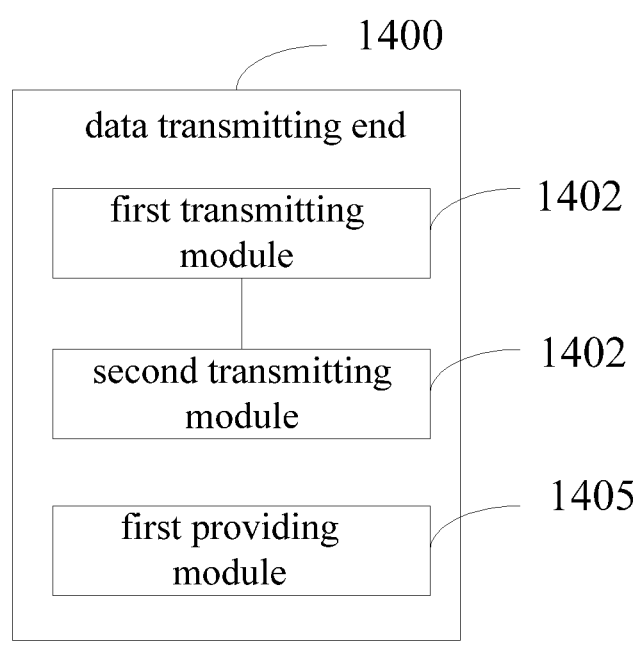
FIG. 16 is a schematic diagram illustrating structure of another data transmitting end, in accordance with an embodiment of the present disclosure.

Optionally, when the association relationship indication information indicates that one SDAP entity corresponds to one PDU session, or one SDAP entity corresponds to one PDCP entity, as shown in FIG. 16, the data transmitting end 1400 further includes:

a first providing module 1405, configured to enable the upper layer to provide auxiliary information of the data packet, in which the auxiliary information includes the flow ID.

Figure 17:
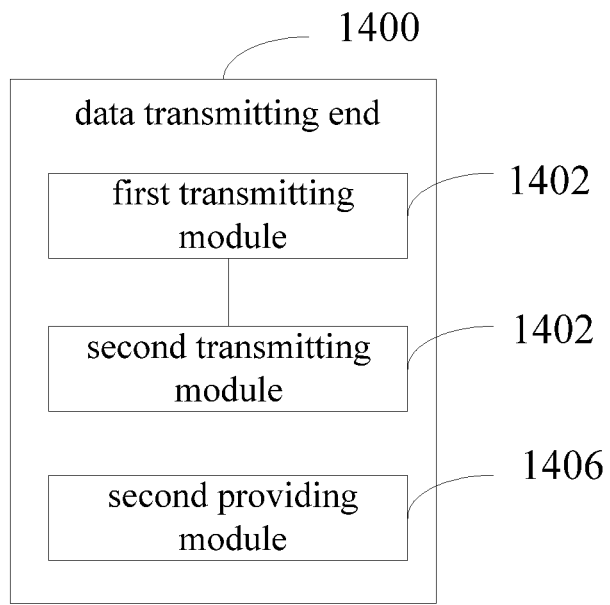
FIG. 17 is a schematic diagram illustrating structure of another data transmitting end, in accordance with an embodiment of the present disclosure.

Optionally, when the association relationship indication information indicates that one SDAP entity corresponds to one MAC entity, or one SDAP entity corresponds to one terminal, as shown in FIG. 17, the data transmitting end 1400 further includes:

a second providing module 1406, configured to enable the upper layer to provide auxiliary information of the data packet, in which the auxiliary information includes at least one of: a flow ID, a network slice ID, or a session ID.

It should be noted that, foregoing data transmitting end 1400 in the embodiment may be a data transmitting end in any implementation among method embodiments of the present disclosure. In the method embodiments of the present disclosure, any implementation of the data transmitting end may be achieved by foregoing data transmitting end 1400 in the embodiment, and the same beneficial effects may be achieved, which is not repeated here.

Figure 18:
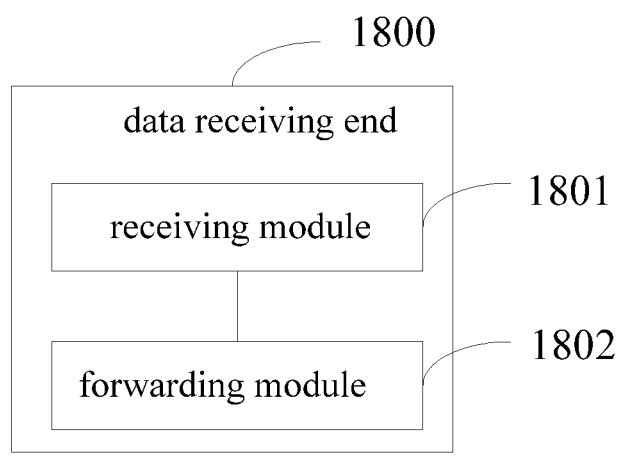
FIG. 18 is a schematic diagram illustrating structure of a data receiving end, in accordance with an embodiment of the present disclosure.

With reference to FIG. 18, FIG. 18 is a schematic diagram illustrating structure of a data receiving end, in accordance with an embodiment of the present disclosure, as shown in FIG. 18, a data receiving end 1800 includes:

a receiving module 1801, configured to enable a PDCP entity to receive a data packet from a data transmitting end, and transmit the data packet to a corresponding SDAP entity, according to a flow ID carried by the data packet;

a forwarding module 1802, configured to enable the SDAP entity to forward the data packet to an application protocol layer, or, forward the data packet to a corresponding network slice, flow, and PDU session.

Optionally, the forwarding module 1802 is specifically configured to enable the SDAP entity to forward the data packet to a corresponding network slice, flow and PDU session, according to at least one of the network slice ID, the SDAP ID, the flow ID or the session ID.

Figure 19:
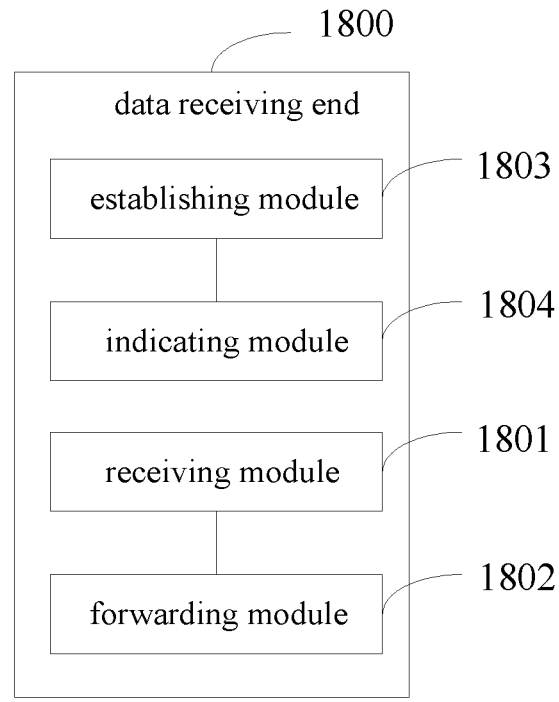
FIG. 19 is a schematic diagram illustrating structure of another data receiving end, in accordance with an embodiment of the present disclosure.

Optionally, as shown in FIG. 19, the data receiving end 1800 further includes:

an establishing module 1803, configured to establish an SDAP entity in advance, according to configuration information which is configured by a network or protocol-agreed, in which the configuration information includes at least one of: a network slice ID, a DRB ID, a flow ID, a session ID, or association relationship indication information;

an indicating module 1804, configured to indicate corresponding relationship information of the SDAP entity to an upper layer, through the SDAP entity, in which the corresponding relationship information includes at least one of: a network slice ID, a DRB ID, a flow ID, a session ID, or an SDAP ID.

Optionally, the association relationship indication information includes at least one of:

indicating that one SDAP entity corresponds to one flow;

indicating that one SDAP entity corresponds to one PDU session;

indicating that one SDAP entity corresponds to one PDCP entity;

indicating that one SDAP entity corresponds to one MAC entity;

indicating that one SDAP entity corresponds to one terminal.

Optionally, when the association relationship indication information indicates that one SDAP entity corresponds to one MAC entity, the configuration information further includes a MAC ID.

Optionally, when the association relationship indication information indicates that one SDAP entity corresponds to one PDU session, indicates that one SDAP entity corresponds to one PDCP entity, indicates that one SDAP entity corresponds to one MAC entity, indicates that one SDAP entity corresponds to one terminal, the corresponding relationship information further includes the association relationship indication information.

It should be noted that, in the embodiment, foregoing data receiving end 1800 may be a data receiving end of any implementation in various method embodiments of the present disclosure. Any implementation of the data receiving end in various method embodiments of the present disclosure may be achieved by foregoing data receiving end 1800 in the embodiment, and the same beneficial effects may be achieved, which is not repeated here.

Figure 20:
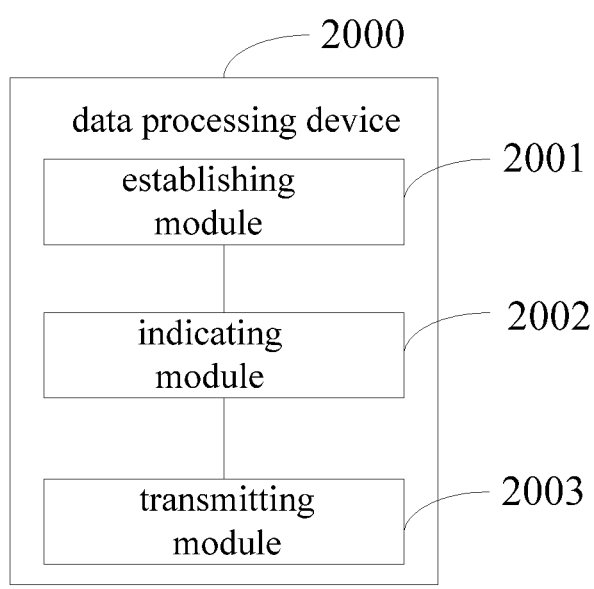
FIG. 20 is a schematic diagram illustrating structure of a data processing device, in accordance with an embodiment of the present disclosure.

With reference to FIG. 20, FIG. 20 is a schematic diagram illustrating structure of a data processing device, in accordance with an embodiment of the present disclosure. As shown in FIG. 20, a data processing device 2000 includes an establishing module 2001, an indicating module 2002, and a transmitting module 2003.

The establishing module 2001 is configured to establish an SDAP entity in advance, according to configuration information which is configured by a network or protocol-agreed, in which the configuration information includes at least one of: a network slice ID, a DRB ID, a flow ID, a session ID, or association relationship indication information.

The indicating module 2002 is configured to indicate corresponding relationship information of the SDAP entity to an upper layer through the SDAP entity.

The transmitting module 2003 is configured to transmit data among the upper layer, the SDAP entity and a PDCP entity, according to the corresponding relationship.

Optionally, the association relationship indication information includes any of the following:

indicating that one SDAP entity corresponds to one flow;

indicating that one SDAP entity corresponds to one PDU session;

indicating that one SDAP entity corresponds to one PDCP entity;

indicating that one SDAP entity corresponds to one MAC entity;

indicating that one SDAP entity corresponds to one terminal.

Optionally, when the association relationship indication information indicates that one SDAP entity corresponds to one MAC entity, the configuration information further includes a MAC ID.

Optionally, the corresponding relationship information includes at least one of: a network slice ID, a DRB ID, a flow ID, a session ID, or an SDAP ID.

Figure 21:
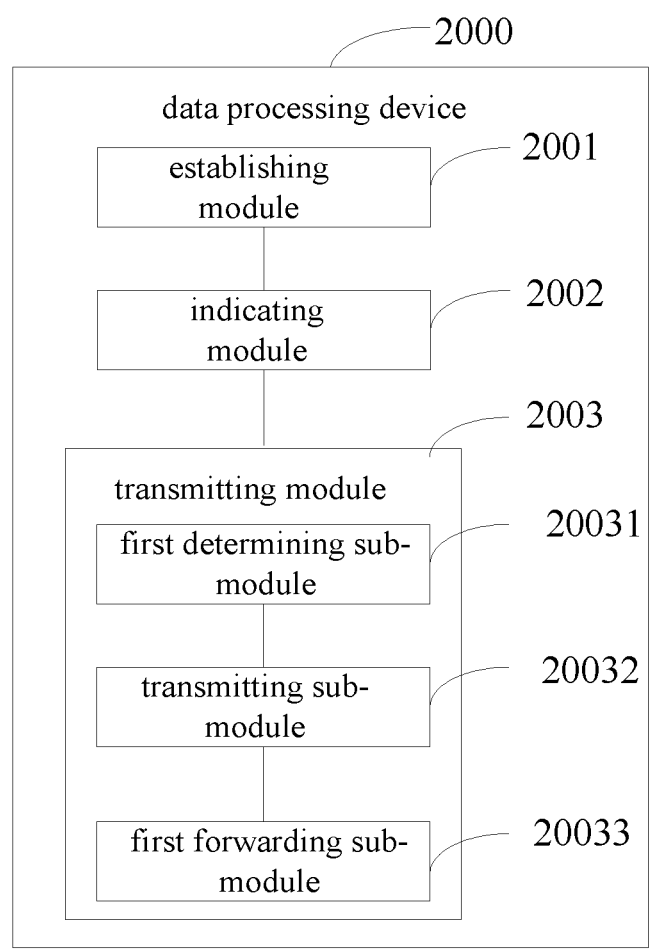
FIG. 21 is a schematic diagram illustrating structure of another data processing device, in accordance with an embodiment of the present disclosure.

Optionally, when the data processing device 2000 is applied to a transmitting end, as shown in FIG. 21, the transmitting module 2003 includes a first determining sub-module 20031, a transmitting sub-module 20032, and a first forwarding sub-module 20033.

The first determining sub-module 20031 is configured to enable the upper layer to determine a target SDAP entity corresponding to a to-be-transmitted target data packet, according to at least one of a network slice ID, an SDAP ID, a flow ID or a session ID.

The transmitting sub-module 20032 is configured to enable the upper layer to transmit the target data packet to the target SDAP entity.

The first forwarding sub-module 20033 is configured to enable the target SDAP entity to forward the target data packet to a target PDCP entity corresponding to a DRB, after adding a flow ID to the target data packet, according to a corresponding relationship between an SDAP entity and a DRB.

Optionally, when the association relationship indication information indicates that one SDAP entity corresponds to one PDU session, or one PDCP entity, the upper layer provides auxiliary information of the transmitted target data packet, in which the auxiliary information includes a flow ID.

Optionally, when the association relationship indication information indicates that one SDAP entity corresponds to one MAC entity, or one terminal, the upper layer provides the auxiliary information of the transmitted target data packet, in which the auxiliary information includes at least one of: a flow ID, a network slice ID, or a session ID.

Figure 22:
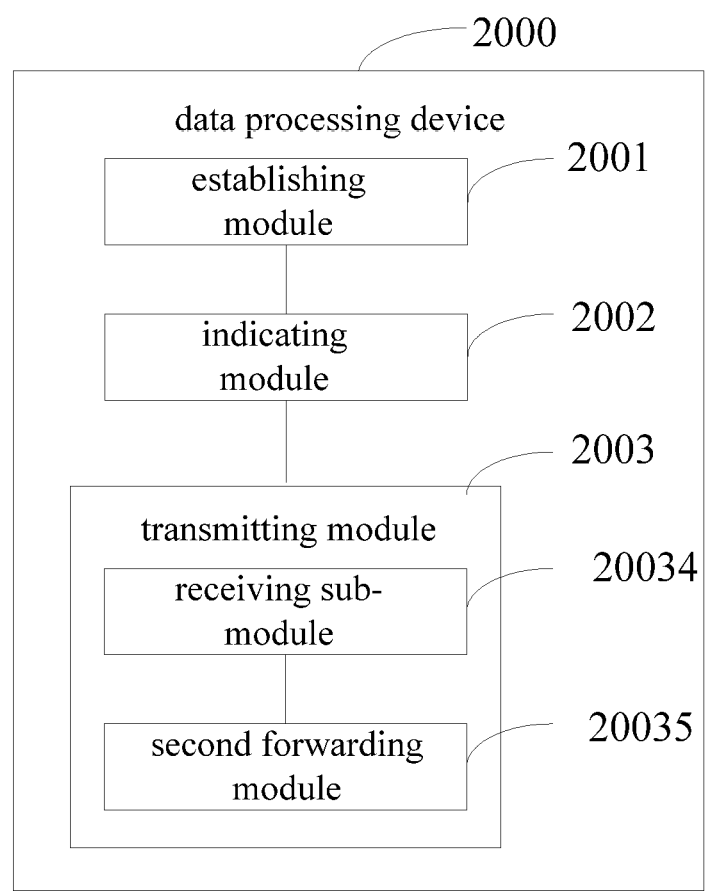
FIG. 22 is a schematic diagram illustrating structure of another data processing device, in accordance with an embodiment of the present disclosure.

Optionally, when the data processing device 2000 is applied to a receiving end, as shown in FIG. 22, the transmitting module 2003 includes a receiving sub-module 20034 and a second forwarding module 20035.

The receiving sub-module 20034 is configured to enable a PDCP entity to receive a target data packet from a transmitting end.

The second forwarding module 20035 is configured to enable the PDCP entity to forward the target data packet to a corresponding SDAP entity, according to a flow ID carried by the target data packet.

Figure 23:
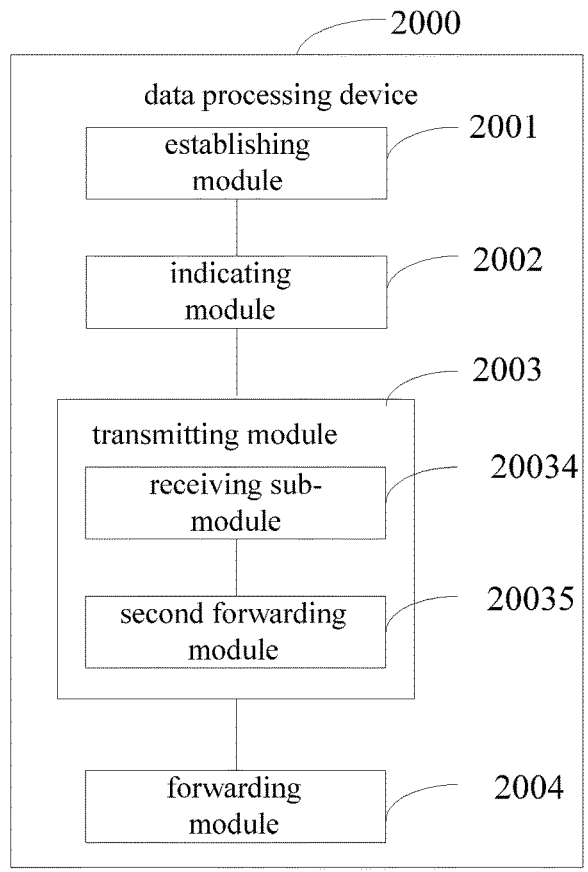
FIG. 23 is a schematic diagram illustrating structure of another data processing device, in accordance with an embodiment of the present disclosure.

Optionally, when the receiving end is a network device, as shown in FIG. 23, the data processing device 2000 further includes:

a forwarding module 2004, configured to enable the target SDAP entity to forward the received target data packet to a corresponding network slice, flow and PDU session.

Optionally, when the receiving end is a terminal, the target SDAP entity forwards the received data packet to an application protocol layer.

It should be noted that, in the embodiment, foregoing data processing device 2000 achieves any implementation of the data processing methods, which are provided by embodiments of the present disclosure. And, the same beneficial effects may be achieved, which is not repeated here.

Figure 24:
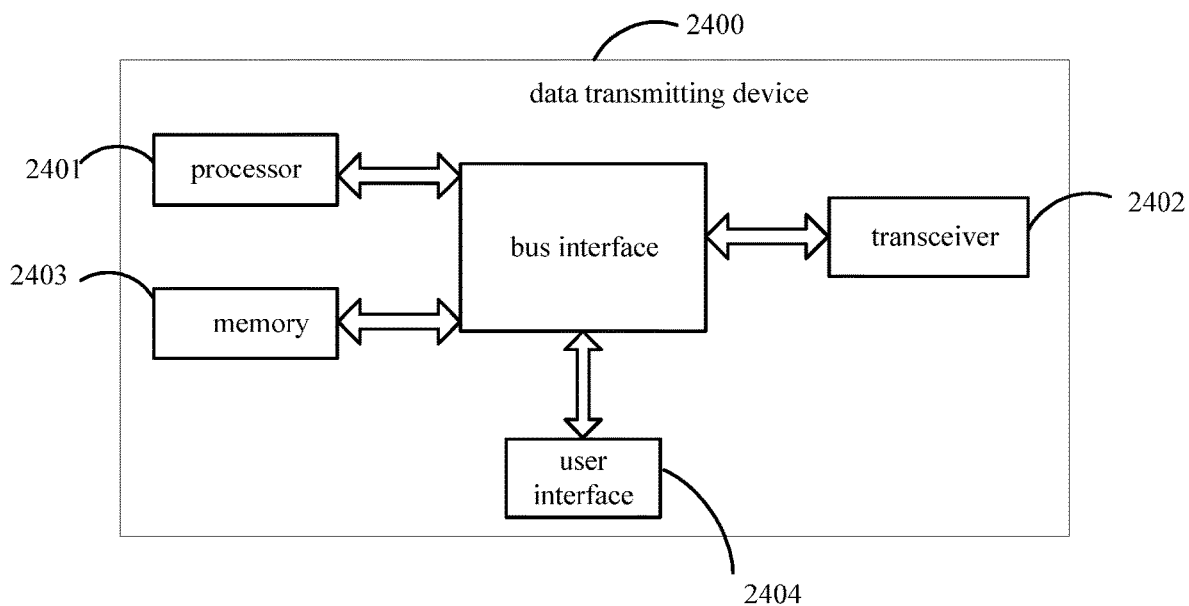
FIG. 24 is a schematic diagram illustrating structure of another data transmitting end, in accordance with an embodiment of the present disclosure.

With reference to FIG. 24, FIG. 24 is a schematic diagram illustrating structure of a data transmitting end, which is applied to an embodiment of the present disclosure. As shown in FIG. 24, a data transmitting end 2400 includes: at least one processor 2401, a memory 2402, at least one network interface 2404, and a user interface 2403. Each component within the data transmitting end 2400 may be coupled through a bus system 2405. It may be understood that, the bus system 2405 is configured to implement connection communications among these components. In addition to data bus, the bus system 2405 further includes a power bus, a control bus and a status signal bus. However, for clarity of description, various buses in FIG. 24 are labeled as the bus system 2405.

The user interface 2403 may include a display, a keyboard, or a click device (e.g., a mouse, a track ball, a touch pad, or a touch screen, and so on).

It may be understood that, in the embodiment of the present disclosure, the memory 2402 may be a transitory memory, or a non-transitory memory, or may include both of a transitory memory and a non-transitory memory. The non-transitory memory may be a Read-Only Memory (ROM), a Programmable ROM (PROM), an Erasable PROM (EPROM), an Electrically EPROM (EEPROM) or a flash memory. The transitory-memory may be a Random Access Memory (RAM), which is taken as an external cache. By way of illustration and not limitation, many forms of RAM are available, e.g., a Static RAM (SRAM), a Dynamic RAM (DRAM), a Double Data Rate SDRAM (DDRSDRAM), an Enhanced SDRAM (ESDRAM), a Synchlink DRAM (SLDRAM) and a Direct Rambus RAM (DRRAM). The memory 2402 of the system and method described herein is intended to include, without limitation to, these and any other suitable types of memory.

In some embodiments, the memory 2402 includes the following elements, executable modules, or data structures, or their subset, or their extension set: an Operating System (OS) 24021 and an application 24022.

The OS 24021 includes various system programs, such as, a frame layer, a core library layer, a driver layer, and so on, which are configured to implement various basic services and process hardware-based tasks. The application 24022 includes various applications, e.g., a Media Player, a Browser, and so on, which are configured to implement various application services. The program implementing the method in the embodiment of the present disclosure may be included by the application 24022.

In the embodiment of the present disclosure, by calling the program or instruction stored in the memory 2402, specifically, the program or instruction stored by the application 2402, the processor 2401 is configured to:

enable an upper layer to transmit a data packet to a corresponding SDAP entity, according to at least one of a network slice ID, an SDAP ID, a flow ID, or a session ID.

The SDAP entity adds the flow ID to the data packet, and transmits the data packet with the flow ID to a PDCP entity corresponding to a DRB, according to a corresponding relationship between an SDAP entity and a DRB.

Foregoing method provided by the embodiment of the present disclosure may be applied to the processor 2401, or may be implemented by the processor 2401. The processor 2401 may be an integrated circuit chip with signal processing capability. In the implementation process, various steps of foregoing method may be completed, by using the integrated logic circuit of hardware in the processor 2401, or by using instructions in the form of software. Foregoing processor 2401 may be a general processor, a Digital Signal Processor (DSP), an Application Specific Integrated Circuit (ASIC), a Field Programmable Gate Array (FPGA), or other programmable logic devices, discrete gates or transistor logic devices, discrete hardware components. Each method, block and logical block diagram in the embodiments of the present disclosure may be implemented, or executed. The general processor may be a micro-processor, or any conventional processor, and so on. Combining with method steps in the embodiments of the present disclosure, it may be directly implemented by a hardware decoding processor, or may be executed by a combination of hardware and software modules in the decoding processor. Software modules may be located in a mature storage medium in the field, such as, an RAM, a flash memory, an ROM, a PROM, an electrically erasable programmable memory, a register. The storage medium is located in the memory 2402, the processor 2401 reads information in the memory 2402, and completes foregoing method steps in combination with the hardware.

It may be understood that, these embodiments described in the present disclosure may be implemented by hardware, software, firmware, middleware, microcode, or a combination thereof. For hardware implementation, a processing unit may be implemented in one or more ASICs, DSPs, DSP Devices (DSPDs), Programmable Logic Device (PLDs), FPGAs, general processors, controllers, micro-controllers, micro-processors, other electronic units or combinations thereof for performing the functions described in the present disclosure.

For software implementation, the techniques described in the present disclosure may be implemented by modules (e.g., procedures, functions, etc.) that perform the functions of the present disclosure. Software codes may be stored in the memory, and executed by the processor. The memory may be implemented in the processor or external to the processor.

Optionally, before the upper layer transmits the data packet to the corresponding SDAP entity, according to at least one of the network slice ID, the SDAP ID, the flow ID, or the session ID, the processor 2401 is further configured to:

establish an SDAP entity in advance, according to configuration information which is configured by a network or protocol-agreed, in which the configuration information includes at least one of: a network slice ID, a DRB ID, a flow ID, a session ID, or association relationship indication information; and, indicate corresponding relationship information of the SDAP entity to the upper layer through the SDAP entity, in which the corresponding relationship information includes at least one of: a network slice ID, a DRB ID, a flow ID, a session ID, or an SDAP ID.

Optionally, the association relationship indication information includes any of the following:

indicating that one SDAP entity corresponds to one flow;
indicating that one SDAP entity corresponds to one PDU session;
indicating that one SDAP entity corresponds to one PDCP entity;
indicating that one SDAP entity corresponds to one MAC entity;
indicating that one SDAP entity corresponds to one terminal.

Optionally, when the association relationship indication information indicates that one SDAP entity corresponds to one MAC entity, the configuration information further includes a MAC ID.

Optionally, when the association relationship indication information indicates that one SDAP entity corresponds to one PDU session, indicates that one SDAP entity corresponds to one PDCP entity, indicates that one SDAP entity corresponds to one MAC entity, or indicates that one SDAP entity corresponds to one terminal, the corresponding relationship information further includes the association relationship indication information.

Optionally, when the association relationship indication information indicates that one SDAP entity corresponds to one PDU session, or indicates that one SDAP entity corresponds to one PDCP entity, the processor 2401 is further configured to:

enable the upper layer to provide auxiliary information of the data packet, in which the auxiliary information includes the flow ID.

Optionally, when the association relationship indication information indicates that one SDAP entity corresponds to one MAC entity, or indicates that one SDAP entity corresponds to one terminal, the processor 2401 is further configured to:

enable the upper layer to provide the auxiliary information of the data packet, in which the auxiliary information includes at least one of: a flow ID, a network slice ID, or a session ID.

It should be noted that, in the embodiment, forgoing data transmitting end 2400 achieves any implementation of the data transmission method, which is provided by an embodiment of the present disclosure. And, the same beneficial effects may be achieved, which is not repeated here.

Figure 25:
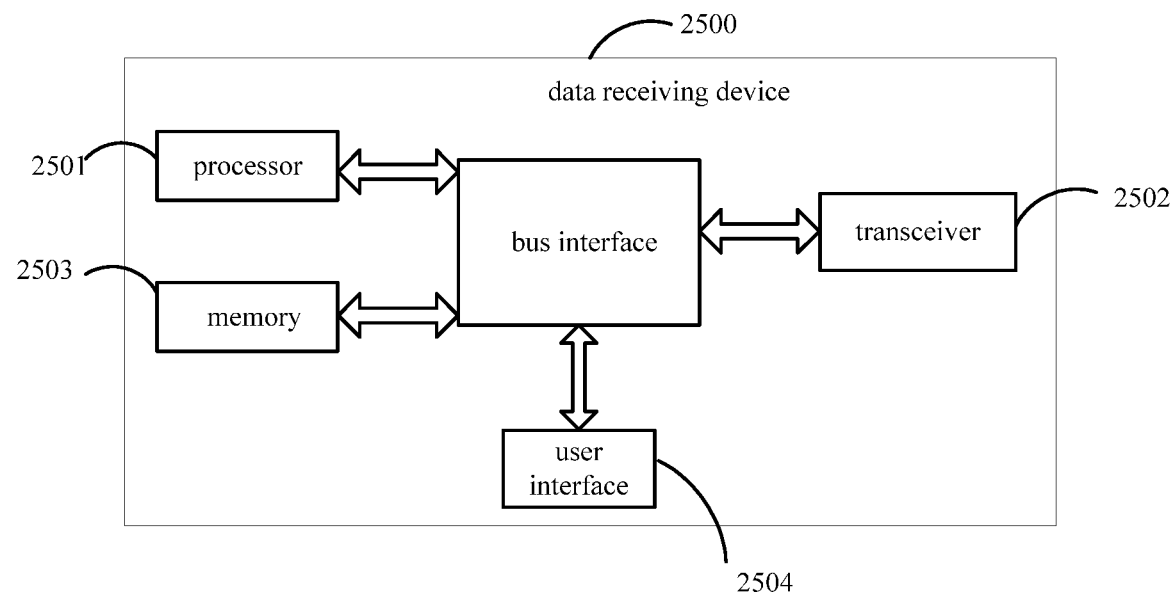
FIG. 25 is a schematic diagram illustrating structure of another data receiving end, in accordance with an embodiment of the present disclosure.

With reference to FIG. 25, FIG. 25 is a schematic diagram illustrating structure of a data receiving end, which is applied to an embodiment of the present disclosure. As shown in FIG. 25, a data receiving end 2500 includes: at least one processor 2501, a memory 2502, at least one network interface 2504, and a user interface 2503. Each component in the data receiving end 2500 is coupled through a bus system 2505. It may be understood that, the bus system 2505 is configured to implement connection communications among these components. In addition to data bus, the bus system 2505 further includes a power bus, a control bus, and a status signal bus. However, for clarity of description, in FIG. 25, various buses are labeled as the bus system 2505.

The user interface 2503 may include a display, a keyboard or a click device (e.g., a mouse, a track ball, a touch pad, or a touch screen, and so on).

It may be understood that, in the embodiment of the present disclosure, the memory 2502 may be a transitory memory, or a non-transitory memory, or may include both of a transitory memory and a non-transitory memory. The non-transitory memory may be an ROM, a PROM, an EPROM, an EEPROM, or a flash memory. The transitory memory may be an RAM, which is taken as an external cache. By way of illustration and not limitation, many forms of RAM are available, e.g., an SRAM, a DRAM, an SDRAM, a DDRSDRAM, an ESDRAM, an SLDRAM and a DRRAM. The memory 2502 of systems and methods described in the present disclosure is intended to include, without limitation to, these and any other suitable types of memory.

In some embodiments, the memory 2502 stores the following elements, executable modules or data structures, or their subsets, or their extension sets: an OS 25021 and an application 25022.

The OS 25021 includes various system programs, e.g., a frame layer, a core library layer, a driver layer, etc., which are configured to implement various basic services and hardware-based tasks. The application 25022 includes various applications, e.g., a Media Player, a Browser, and so on, which are configured to implement various application services. The program implementing the method in the embodiment of the present disclosure may be included in the application 25022.

In the embodiment of the present disclosure, by calling the program or instruction stored by the memory 2502, specifically, the program or instruction stored in the application 25022, the processor 2501 is configured to:

enable a PDCP entity to receive a data packet from a data transmitting end, and transmit the data packet to a corresponding SDAP entity, according to a flow ID carried by the data packet; and, the SDAP entity forward the data packet to an application protocol layer, or forward the data packet to a corresponding network slice, a flow, and a PDU session.

Foregoing method provided by the embodiment of the present disclosure may be applied to the processor 2501, or may be implemented by the processor 2501. The processor 2501 may be an integrated circuit chip with signal processing capability. In the implementation process, various steps of foregoing method may be completed by the integrated logical circuit of hardware in the processor 2501, or by instructions in the form of software. Foregoing processor 2501 may be a general processor, a DSP, an ASIC, a FPGA or other programmable logic devices, discrete gates or transistor logic devices, discrete hardware components. Each method, block and logic block diagram provided by the embodiments of the present disclosure may be implemented or executed. The general processor may be a micro-processor, or any conventional processor, and so on. Combining with method steps provided by embodiments of the present disclosure, it may be directly implemented as a hardware decoding processor, or may be executed by a combination of hardware and software modules in the decoding processor. Software modules may be located in a mature storage medium in the field, such as, an RAM, a flash memory, an ROM, a PROM, an electrically erasable programmable memory, a register. The storage medium is located in the memory 2502, the processor 2501 reads information from the memory 2502, and completes foregoing method steps in combination with the hardware.

It may be understood that, these embodiments described in the present disclosure may be implemented by hardware, software, firmware, middleware, microcode, or a combination thereof. For hardware implementation, a processing unit may be implemented in one or more ASICs, DSPs, DSP Devices (DSPDs), Programmable Logic Device (PLDs), FPGAs, general processors, controllers, micro-controllers, micro-processors, other electronic units or combinations thereof for performing the functions described in the present disclosure.

For software implementation, the techniques described in the present disclosure may be implemented by modules (e.g., procedures, functions, etc.) that perform the functions of the present disclosure. Software codes may be stored in the memory, and executed by the processor. The memory may be implemented in the processor or external to the processor.

Optionally, the process of the SDAP entity forwarding the data packet to the corresponding network slice, flow and PDU session, which is executed by the processor 2501, includes:

the SDAP entity forwards the data packet to the corresponding network slice, flow and PDU session, according to at least one of a network slice ID, an SDAP ID, a flow ID, or a session ID.

Optionally, the processor 2501 is further configured to:

establish an SDAP entity in advance, according to configuration information which is configured by a network or protocol-agreed, in which the configuration information includes at least one of: a network slice ID, a DRB ID, a flow ID, a session ID, or association relationship indication information; and, indicate corresponding relationship information of the SDAP entity to an upper layer through the SDAP entity, in which the corresponding relationship information includes at least one of: a network slice ID, a DRB ID, a flow ID, a session ID, or an SDAP ID.

Optionally, the association relationship indication information includes any of the following:

indicating that one SDAP entity corresponds to one flow;

indicating that one SDAP entity corresponds to one PDU session;

indicating that one SDAP entity corresponds to one PDCP entity;

indicating that one SDAP entity corresponds to one MAC entity;

indicating that one SDAP entity corresponds to one terminal.

Optionally, when the association relationship indication information indicates that one SDAP entity corresponds to one MAC entity, the configuration information further includes a MAC ID.

Optionally, when the association relationship indication information indicates that one SDAP entity corresponds to one PDU session, indicates that one SDAP entity corresponds to one PDCP entity, indicates that one SDAP entity corresponds to one MAC entity, or indicates that one SDAP entity corresponds to one terminal, the corresponding relationship information further includes the association relationship indication information.

It should be noted that, in the embodiment, foregoing data receiving end 2500 achieves any implementation of the data transmission method, which is provided by the embodiment of the present disclosure. And, the same beneficial effects may be achieved, which is not repeated here.

Figure 26:
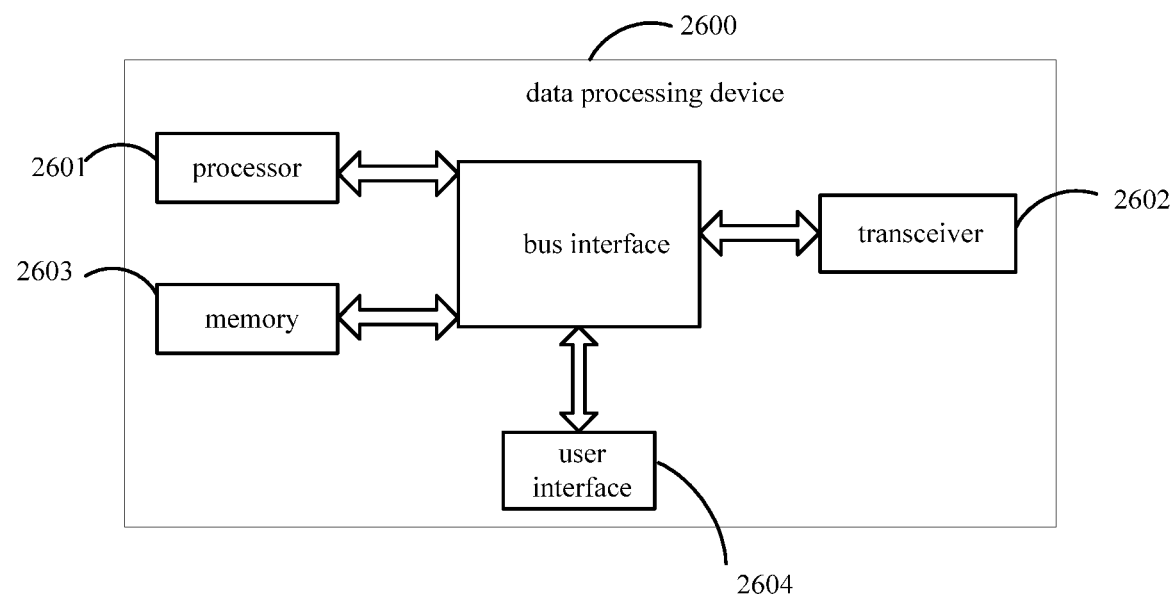
FIG. 26 is a schematic diagram illustrating structure of still another data processing device, in accordance with an embodiment of the present disclosure.

With reference to FIG. 26, FIG. 26 is a schematic diagram illustrating structure of a data processing device, which is applied to an embodiment of the present disclosure. As shown in FIG. 26, a data processing device 2600 includes: at least one processor 2601, a memory 2602, at least one network interface 2604 and a user interface 2603. Each component in the data processing device 2600 is coupled through a bus system 2605. It may be understood that, the bus system 2605 is configured to implement connection communications among these components. In addition to data bus, the bus system 2605 further includes a power bus, a control bus and a status signal bus. However, for clarity of description, in FIG. 26, various buses are labeled as the bus system 2605.

The user interface 2603 may include a display, a keyboard, or a click device (e.g., a mouse, a track ball, a touch pad, or a touch screen).

It may be understood that, in the embodiment of the present disclosure, the memory 2602 may be a transitory memory, or a non-transitory memory, or may include both of a transitory memory and a non-transitory memory. The non-transitory memory may be an ROM, a PROM, an EPROM, an EEPROM, or a flash memory. The transitory memory may be an RAM, which is taken as an external cache. By way of illustration and without limitation, many forms of RAM are available, e.g., an SRAM, a DRAM, an SDRAM, a DDRSDRAM, an ESDRAM, an SLDRAM and a DRRAM. The memory 2602 of systems and methods described in the present disclosure is intended to include, without limitation to, these and any other suitable types of memory.

In some embodiments, the memory 2602 stores the following elements, executable modules, or data structures, or their subsets, or their extension sets: an OS 26021 and an application 26022.

The OS 26021 includes various system programs, e.g., a frame layer, a core library layer, a driver layer, and so on, which are configured to implement various basic services, and process hardware-based tasks. The application 26022 includes various applications, e.g., a Media Player, a Browser, and so on, which are configured to implement various application services. The program implementing the method in the embodiment of the present disclosure may be included by the application 26022.

In the embodiment of the present disclosure, by calling the program or instruction stored in the memory 2602, specifically, the program or instruction stored in the application 26022, the processor 2601 is configured to:

establish an SDAP entity in advance, according to configuration information which is configured by a network or protocol-agreed, in which the configuration information includes at least one of: a network slice ID, a DRB ID, a flow ID, a session ID, or association relationship indication information;

indicate corresponding relationship information of the SDAP entity to an upper layer through the SDAP entity; and, transmit data among the upper layer, the SDAP entity, and a PDCP entity according to the corresponding relationship information.

Foregoing method provided by the embodiment of the present disclosure may be applied to the processor 2601, or may be implemented by the processor 2601. The processor 2601 may be an integrated circuit chip with signal processing capability. In the implementation process, each step of foregoing method may be completed, by using the integrated logic circuit of hardware in the processor 2601, or by using instructions in the form of software. Foregoing processor 2601 may be a general processor, a DSP, an ASIC, an FPGA, or other programmable logic device, discrete gate or transistor logic device, discrete hardware components. Each method, block and logic block diagram provided by embodiments of the present disclosure may be implemented or executed. The general processor may be a micro-processor, or any conventional processor, and so on. Combining with method steps provided by embodiments of the present disclosure, it may be directly implemented as a hardware decoding processor, or may be executed by a combination of hardware and software modules in the decoding processor. Software modules may be located in a mature storage medium in the field, such as, an RAM, a flash memory, an ROM, a PROM, an electrically erasable programmable memory, a register. The storage medium is located in the memory 2602, the processor 2601 reads information from the memory 2602, and completes foregoing method steps in combination with the hardware.

It may be understood that, these embodiments described in the present disclosure may be implemented by hardware, software, firmware, middleware, microcode, or a combination thereof. For hardware implementation, a processing unit may be implemented in one or more ASICs, DSPs, DSP Devices (DSPDs), Programmable Logic Device (PLDs), FPGAs, general processors, controllers, micro-controllers, micro-processors, other electronic units or combinations thereof for performing the functions described in the present disclosure.

For software implementation, the techniques described in the present disclosure may be implemented by modules (e.g., procedures, functions, etc.) that perform the functions of the present disclosure. Software codes may be stored in the memory, and executed by the processor. The memory may be implemented in the processor or external to the processor.

Optionally, the association relationship indication information includes at least one of:

indicating that one SDAP entity corresponds to one flow;

indicating that one SDAP entity corresponds to one PDU session;

indicating that one SDAP entity corresponds to one PDCP entity;

indicating that one SDAP entity corresponds to one MAC entity;

indicating that one SDAP entity corresponds to one terminal.

Optionally, when the association relationship indication information indicates that one SDAP entity corresponds to one MAC entity, the configuration information further includes a MAC ID.

Optionally, the corresponding relationship information includes at least one of: a network slice ID, a DRB ID, a flow ID, a session ID, or an SDAP ID.

Optionally, when the data processing method is applied to a transmitting end, the step of transmitting data among the upper layer, the SDAP entity and the PDCP entity, according to the corresponding relationship information, which is performed by the processor 2601, includes:

determining a target SDAP entity corresponding to a to-be-transmitted target data packet, according to at least one of a network slice ID, an SDAP ID, a flow ID, or a session ID;

the upper layer transmits the target data packet to the target SDAP entity;

after adding the flow ID to the target data packet, the target SDAP entity forwards the target data packet with the flow ID to a target PDCP entity corresponding to a DRB, according to a corresponding relationship between an SDAP entity and a DRB.

Optionally, when the association relationship indication information indicates that one SDAP entity corresponds to one PDU session, or indicates that one SDAP entity corresponds to one PDCP entity, the upper layer provides auxiliary information of the transmitted target data packet, in which the auxiliary information includes a flow ID.

Optionally, when the association relationship indication information indicates that one SDAP entity corresponds to one MAC entity, or indicates that one SDAP entity corresponds to one terminal, the upper layer provides the auxiliary information of the transmitted target data packet, in which the auxiliary information includes at least one of: a flow ID, a network slice ID, or a session ID.

Optionally, when the data processing method is applied to a receiving end, the step of transmitting data among the upper layer, the SDAP entity and the PDCP entity, according to the corresponding relationship information, which is performed by the processor 2601, includes:

the PDCP entity receives the target data packet from a transmitting end;

the PDCP entity forwards the target data packet to the corresponding target SDAP entity, according to the flow ID carried by the target data packet.

Optionally, when the receiving end is a network device, after the step of forwarding the target data packet to the corresponding SDAP entity, the processor 2601 is further configured to:

enable the target SDAP entity to forward the received target data packet to a corresponding network slice, flow and PDU session.

Optionally, when the receiving end is a terminal, the target SDAP entity forwards the received data packet to an application protocol layer.

It should be noted that, in the embodiment, foregoing data processing device 2600 achieves any implementation of the data processing method, which is provided by the embodiment of the present disclosure. And, the same beneficial effects may be achieved, which is not repeated here.

In an eighth aspect, an embodiment of the present disclosure also provides a computer readable storage medium, which stores a data transmission program. When the data transmission program is executed by the processor, steps of data transmission method at the data transmitting end provided by embodiments of the present disclosure is implemented.

In a ninth aspect, an embodiment of the present disclosure also provides a computer readable storage medium, which stores a data transmission program. When the data transmission program is executed by the processor, steps of data transmission method at the data receiving end provided by embodiments of the present disclosure is implemented.

Persons having ordinary skill in the art may learn that, units and algorithm steps of each example described by embodiments of the present disclosure may be implemented in electronic hardware, or in a combination of computer software and electronic hardware. Whether these functions are performed by hardware or software depends on specific application and design constraints of technical solutions. For each specific application, a person skilled in the art may adopt a different method to implement the described functions. However, such implementation should not be considered to go beyond the scope of the present disclosure.

Persons having ordinary skill in the art may clearly learn that, for convenience and conciseness of description, the specific working process of above-described system, device and unit may refer to corresponding process of foregoing method embodiments, which is not repeated here.

In the embodiments of the present disclosure, it should be understood that, the disclosed devices and methods may be implemented with other methods. For example, the above-described device embodiments are only illustrative, e.g., the division of the unit is only a logic function division. In practical implementation, there may be another division method. For example, multiple units or components may be combined, or integrated into another system, or some features may be omitted, or not executed. From another point, the mutual coupling or direct coupling, or communication connection shown or discussed may be indirect coupling, or communication connections through some interfaces, devices, or units, which may be electronic, mechanical, or in other form.

Units described as separate components may be, or may be not physically separate. A component displayed as a unit may be, or may be not a physical unit, that is, it may be located in one place, or may be distributed to multiple network units. According to practical requirements, some units or all the units may be selected to implement the objective of solutions in the embodiments of the present disclosure.

In addition, in each embodiment of the present disclosure, various functional units may be integrated into a processing unit. Alternatively, each unit physically exists alone. Still alternatively, two or more units may be integrated into one unit.

When the functions are implemented in the form of software functional unit, which is sold or used as an independent product, such software functional unit may be stored in a computer readable storage medium. According to such understandings, the technical solution of the present disclosure, or, a part contributing to the prior art, or a part of the technical solution may be embodied in the form of a software product. The computer software produce is stored in one storage medium, including several instructions to enable a computer device (may be a Personal Computer (PC), a server, or a network device, etc.) to implement all the steps, or some steps in the method of each embodiment of the present disclosure. Foregoing storage medium includes various media that can store program codes, such as a U disk, a mobile hard disk, an ROM, an RAM, a disk, or a Compact Disk (CD), and so on.

Foregoing is only specific implementations of the present disclosure. However, protection scope of the present disclosure is not limited. Any changes or substitutions that are obvious to those skilled in the art within the scope of the present disclosure are covered by the scope of the present disclosure. Therefore, the protection scope of the disclosure should be determined by the scope of the claims.

What is claimed is:

1. A data receiving end, comprising: a processor, a memory, a network interface and a user interface, wherein the processor, the memory, the network interface and the user interface are coupled through a bus system, the processor is configured to read a program from the memory to perform: receiving, by a Packet Data Convergence Protocol (PDCP) entity, a data packet from a data transmitting end, and transmitting the data packet to a corresponding Service Data Adaptation Protocol (SDAP) entity according to a flow identifier carried by the data packet; and, forwarding, by the SDAP entity, the data packet to an application protocol layer, or forwarding the data packet to a corresponding network slice, a flow and a Protocol Data Unit (PDU) session; wherein the processor is further configured to read the program from the memory to perform: establishing the SDAP entity in advance, according to configuration information which is configured by a network or protocol-agreed; wherein the configuration information comprises at least one of a network slice identifier, a Data Radio Bearer (DRB) identifier, the flow identifier, a session identifier, or association relationship indication information; wherein the association relationship indication information comprises any one of: indicating that one SDAP entity corresponds to one flow; indicating that one SDAP entity corresponds to one PDU session; indicating that one SDAP entity corresponds to one PDCP entity; indicating that one SDAP entity corresponds to one Medium Access Control (MAC) entity; indicating that one SDAP entity corresponds to one terminal.

2. The data receiving end according to claim 1, wherein when forwarding by the SDAP entity, the data packet to the corresponding network slice, flow and PDU session, the processor is further configured to read the program from the memory to perform: forwarding, by the SDAP entity, the data packet to the corresponding network slice, flow and PDU session, according to at least one of a network slice identifier, an SDAP identifier, the flow identifier, or a session identifier.

3. The data receiving end according to claim 1, wherein the processor is further configured to read the program from the memory to perform: indicating corresponding relationship information of the SDAP entity to an upper layer through the SDAP entity; wherein the corresponding relationship information comprises at least one of the network slice identifier, the DRB identifier, the flow identifier, the session identifier or an SDAP identifier.

4. The data receiving end according to claim 1, wherein when the association relationship indication information indicates that one SDAP entity corresponds to one MAC entity, the configuration information further comprises an MAC ID.

5. The data receiving end according to claim 1, wherein when the association relationship indication information indicates that one SDAP entity corresponds to one PDU session, indicates that one SDAP entity corresponds to one PDCP entity, indicates that one SDAP entity corresponds to one MAC entity, or indicates that one SDAP entity corresponds to one terminal, the corresponding relationship information further comprises the association relationship indication information.

6. A non-transitory computer readable storage medium, which stores a data transmission program, wherein when the data transmission program is executed by a processor, the processor is caused to perform: receiving, by a Packet Data Convergence Protocol (PDCP) entity, a data packet from a data transmitting end, and transmitting the data packet to a corresponding Service Data Adaptation Protocol (SDAP) entity according to a flow identifier carried by the data packet; and, forwarding, by the SDAP entity, the data packet to an application protocol layer, or forwarding the data packet to a corresponding network slice, a flow and a Protocol Data Unit (PDU) session; wherein when the data transmission program is executed by the processor, the processor is further caused to perform: establishing the SDAP entity in advance, according to configuration information which is configured by a network or protocol-agreed; wherein the configuration information comprises at least one of a network slice identifier, a Data Radio Bearer (DRB) identifier, the flow identifier, a session identifier, or association relationship indication information; wherein the association relationship indication information comprises any one of: indicating that one SDAP entity corresponds to one flow; indicating that one SDAP entity corresponds to one PDU session; indicating that one SDAP entity corresponds to one PDCP entity; indicating that one SDAP entity corresponds to one Medium Access Control (MAC) entity; indicating that one SDAP entity corresponds to one terminal.

7. The non-transitory computer readable storage medium according to claim 6, wherein when forwarding by the SDAP entity, the data packet to the corresponding network slice, flow and PDU session, the processor is further caused to perform: forwarding, by the SDAP entity, the data packet to the corresponding network slice, flow and PDU session, according to at least one of a network slice identifier, an SDAP identifier, the flow identifier, or a session identifier.

8. The non-transitory computer readable storage medium according to claim 6, wherein the processor is further caused to perform: indicating corresponding relationship information of the SDAP entity to an upper layer through the SDAP entity; wherein the corresponding relationship information comprises at least one of the network slice identifier, the DRB identifier, the flow identifier, the session identifier or an SDAP identifier.

9. The non-transitory computer readable storage medium according to claim 6, wherein when the association relationship indication information indicates that one SDAP entity corresponds to one MAC entity, the configuration information further comprises an MAC ID.

10. The non-transitory computer readable storage medium according to claim 6, wherein when the association relationship indication information indicates that one SDAP entity corresponds to one PDU session, indicates that one SDAP entity corresponds to one PDCP entity, indicates that one SDAP entity corresponds to one MAC entity, or indicates that one SDAP entity corresponds to one terminal, the corresponding relationship information further comprises the association relationship indication information.

11. A non-transitory computer readable storage medium, which stores a data transmission program, wherein when the data transmission program is executed by a processor, the processor is caused to perform: transmitting, by an upper layer, a data packet to a corresponding Service Data Adaptation Protocol (SDAP) entity, according to at least one of a network slice identifier, an SDAP identifier, a flow identifier or a session identifier; adding, by the SDAP entity, a flow identifier corresponding to the data packet, to the data packet; and, transmitting the data packet with the flow identifier to a Packet Data Convergence Protocol (PDCP) entity corresponding to a Data Radio Bearer (DRB), according to a corresponding relationship between the SDAP entity and the DRB; wherein before transmitting, by the upper layer, the data packet to the corresponding SDAP entity, according to at least one of the network slice identifier, the flow identifier or the session identifier, the processor is caused to perform: establishing the SDAP entity in advance, according to configuration information which is configured by a network or pre-defined; wherein the configuration information comprises at least one of the network slice identifier, a DRB identifier, the flow identifier, the session identifier, or association relationship indication information; wherein the association relationship indication information comprises any one of: indicating that one SDAP entity corresponds to one flow; indicating that one SDAP entity corresponds to one Protocol Data Unit (PDU) session; indicating that one SDAP entity corresponds to one PDCP entity; indicating that one SDAP entity corresponds to one Medium Access Control (MAC) entity; and, indicating that one SDAP entity corresponds to one terminal.

12. The non-transitory computer readable storage medium according to claim 11, wherein the processor is further caused to perform: indicating corresponding relationship information of the SDAP entity to the upper layer through the SDAP entity; wherein the corresponding relationship information comprises at least one of the network slice identifier, the DRB identifier, the flow identifier, the session identifier or the SDAP identifier.

13. The non-transitory computer readable storage medium according to claim 11, wherein when the association relationship indication information indicates that one SDAP entity corresponds to one MAC entity, the configuration information further comprises MAC ID.

14. The non-transitory computer readable storage medium according to claim 11, wherein when the association relationship indication information indicates that one SDAP entity corresponds to one PDU session, indicates that one SDAP entity corresponds to one PDCP entity, indicates that one SDAP entity corresponds to one MAC entity, or indicates that one SDAP entity corresponds to one terminal, the corresponding relationship information further comprises the association relationship indication information.

15. The computer readable storage medium according to claim 14, wherein when the association relationship indication information indicates that one SDAP entity corresponds to one PDU session, or indicates that one SDAP entity corresponds to one PDCP entity, the processor is further caused to perform: providing, by the upper layer, auxiliary information of the data packet, wherein the auxiliary information comprises the flow identifier.

16. The non-transitory computer readable storage medium according to claim 14, wherein when the association relationship indication information indicates that one SDAP entity corresponds to one MAC entity, or indicates that one SDAP entity corresponds to one terminal, the processor is further caused to perform: providing, by the upper layer, auxiliary information of the data packet, wherein the auxiliary information comprises at least one of the flow identifier, the network slice identifier, or the session identifier.

* * * * *